US009110092B1

(12) United States Patent
Magonov et al.

(10) Patent No.: US 9,110,092 B1
(45) Date of Patent: Aug. 18, 2015

(54) SCANNING PROBE BASED APPARATUS AND METHODS FOR LOW-FORCE PROFILING OF SAMPLE SURFACES AND DETECTION AND MAPPING OF LOCAL MECHANICAL AND ELECTROMAGNETIC PROPERTIES IN NON-RESONANT OSCILLATORY MODE

(71) Applicant: NT-MDT Development Inc., Tempe, AZ (US)

(72) Inventors: Serguei Magonov, Tempe, AZ (US); Sergey Belikov, Goleta, CA (US); John David Alexander, Tempe, AZ (US); Craig Gordon Wall, Chandler, AZ (US); Stanislav Leesment, Moscow-Zelenograd (RU); Viktor Bykov, Moscow-Zelenograd (RU)

(73) Assignee: NT-MDT Development Inc., Tempe, AZ (US)

( * ) Notice: Subject to any disclaimer, the term of this patent is extended or adjusted under 35 U.S.C. 154(b) by 0 days.

(21) Appl. No.: 14/247,041

(22) Filed: Apr. 7, 2014

Related U.S. Application Data

(60) Provisional application No. 61/853,613, filed on Apr. 9, 2013.

(51) Int. Cl.
  *G01N 13/16* (2006.01)
  *G01B 5/28* (2006.01)
  (Continued)

(52) U.S. Cl.
  CPC ............... *G01Q 10/00* (2013.01); *G01Q 60/38* (2013.01); *G05D 23/19* (2013.01)

(58) Field of Classification Search
  CPC ..... G01Q 10/065; G01Q 20/00; G01Q 60/30; G01Q 60/34

USPC ................. 850/1, 5, 21, 25; 73/105
See application file for complete search history.

(56) References Cited

U.S. PATENT DOCUMENTS

| 2,728,222 A | 12/1955 | Becker et al. |
| RE33,387 E | 10/1990 | Binnig |

(Continued)

OTHER PUBLICATIONS

G. Binnig, C.F. Quate, and CH. Gerber "Atomic force microscope" Phys. Rev. Lett. Mar. 3, 1986, pp. 930-933, vol. 56, No. 9.

(Continued)

*Primary Examiner* — Nikita Wells
(74) *Attorney, Agent, or Firm* — Patrick Bright

(57) ABSTRACT

This invention relates to multi-purpose probe-based apparatus, and to methods for providing images of surface topography, and detection and quantitative mapping of local mechanical and electromagnetic properties in non-resonant oscillatory mode. These methods may include filtering of incoming probe signals. These incoming probe signals provide time deflection curves, parts of which are used for the control of scanning and collection of data that reflects sample adhesion, stiffness, elastic modulus and viscoelastic response, electric and magnetic interactions. These methods permit adaptive choice of an AFM's deflection set-point, which allows imaging at the contact repulsive force for precise surface profilometry, as non-resonant oscillation brings tip and sample into intermittent contact. These methods permit choosing a desired deformation model that allows an extraction of quantitative mechanical properties including viscoelastic response from deflection curves. These methods also permit local quantitative measurements of tip-sample current and detection of surface potential, capacitance gradients and piezoresponse in non-resonant oscillatory mode. The stable thermal environment reduces apparatus thermal drift and improves apparatus performance.

10 Claims, 34 Drawing Sheets

(51) Int. Cl.
*G01Q 10/00* (2010.01)
*G01Q 60/38* (2010.01)
*G05D 23/19* (2006.01)

(56) References Cited

U.S. PATENT DOCUMENTS

| | | | |
|---|---|---|---|
| 5,229,606 | A | 7/1993 | Elings et al. |
| 5,308,974 | A | 5/1994 | Elings et al. |
| 5,519,212 | A | 5/1996 | Elings et al. |
| 7,129,486 | B2 * | 10/2006 | Spizig et al. ............ 250/311 |
| 2006/0000263 | A1 * | 1/2006 | Su et al. ............ 73/105 |
| 2010/0122385 | A1 * | 5/2010 | Hu et al. ............ 850/5 |
| 2011/0167524 | A1 * | 7/2011 | Hu et al. ............ 850/1 |
| 2014/0223615 | A1 * | 8/2014 | Shi et al. ............ 850/5 |

OTHER PUBLICATIONS

T.R. Albrecht, and C.F. Quate "Atomic resolution imaging of a non-conductor by atomic for microscopy" J. Appl. Phys., 1987, pp. 2599-2602, vol. 62.

G. Schmalz "Uber Glatte und Ebenheit als physikalisches und physiologishes problem" Z. Vereines Deutscher Ingenieure, Oct. 12, 1929, pp. 1461-1467.

Y. Martin, C.C. Williams, and H.K. Wickramasinghe, "Atomic force microscope-force mapping and profiling on a sub 100-A scale" J. Appl. Phys., 1987, pp. 4723-4729, vol. 61.

Gerhard Meyer and Nabil M. Amer "Novel optical force microscopy" IBM Thomas J. Watson Research Center, Sep. 19, 1988, pp. 1045-1047 Appl. Phys. Lett., vol. 53, No. 12.

S. Alexander, et. al "An atomic-resolution atomic-force microscope implemented using an optical lever" J. Appl. Phys. Jan. 1, 1989, pp. 184-167, vol. 65 No. 1.

A.L. Weisenhorn, P.K. Hansma, T.R. Albrecht and C.F. Quate: "Forces in atomic force microscopy in air and water" Appl. Phys. Lett. 2651-53, Jun. 26, 1986 vol. 54, No. 26.

Nancy A. Burnham, et. al.: "Measuring the nanomechanical propertyles and surface forces of materials using an atomic force microscope" J. Vac. Sci. Technol. A, Jul./Aug. 1969.

Kees O. Van Der Werf, et. al.: "Adhesion force imaging in air and liquid by adhesion mode atomic force microscopy" Appl. Phys. Lett. Aug. 29, 1994, 1195-97, vol. 65, No. 9.

P. Maivald, et. al. "Using force modulation to image surgace elasticities with atomic force microscope" Nanotechnology 2, 1991, 103-106, UK.

U. Rase, et. al., "Quantitative determination of contact stiffness using atomic force acoustic microscopy", Ultrasonics 38, 2000, 430-427, Germany.

R.M. Overney, et al., "Compliance Measurements of Confined Polystrene Solutions by Atomic Force Microscopy", Physicai Review Letters, Feb. 19, 1996, 1272-75, vol. 76, No. 8.

T.R. Albrecht, et al., "Frequency modulation detection using high-Q cantilevers for enhanced force microscope sensitivity", J. Appl. Phys., Jan. 15, 1991, 668-73, vol. 69, #2.

Q. Zhong, et al. , "Fractured polymer/silica fiber surface studied by tapping mode atomic force microscopy", Surface Science Letters, 1993, L688-L692, vol. 290, North Holland.

Sergey Belikov, et al., "Tip-Sample Forces in Atomic Force Microscopy; Interplay between Theory and Experiment", Mater. Res. Soc. Symp. Proc., 2013, vol. 1527.

A Rosa-Zeiser, et al., "The simultaneous measurement of elastic, electrostatic and adhesive properties by scanning force microscopy: pulsed-force mode operation," Meas. Sci. T.

P. J. De Pablo, et. al.: "Jumping mode scanning force microscopy", Applied Physics Letters, Nov. 30, 1998, 3300-02, vol. 73, No. 22.

Ozgur Sahin, et al., "An atomic force microscope tip designed to measure time-varying nanomechanical forces", Nat. Nanotechnol. Jul. 29, 2007, 507-14.

A. F. Sarioglu and O. Solgaard, "Cantilevers with integrated sensor for time-resolved force measurement in tapping-mode atomic force microscopy", Appl. Phys. Lett., 2008, vol. 1.

* cited by examiner

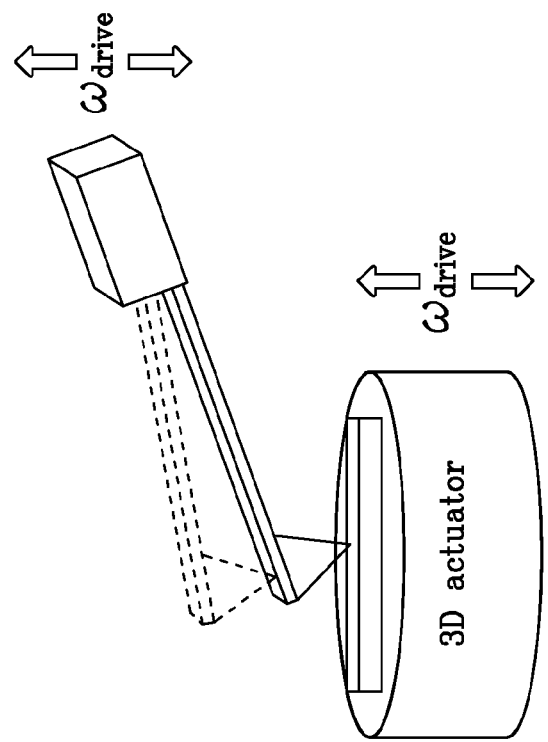
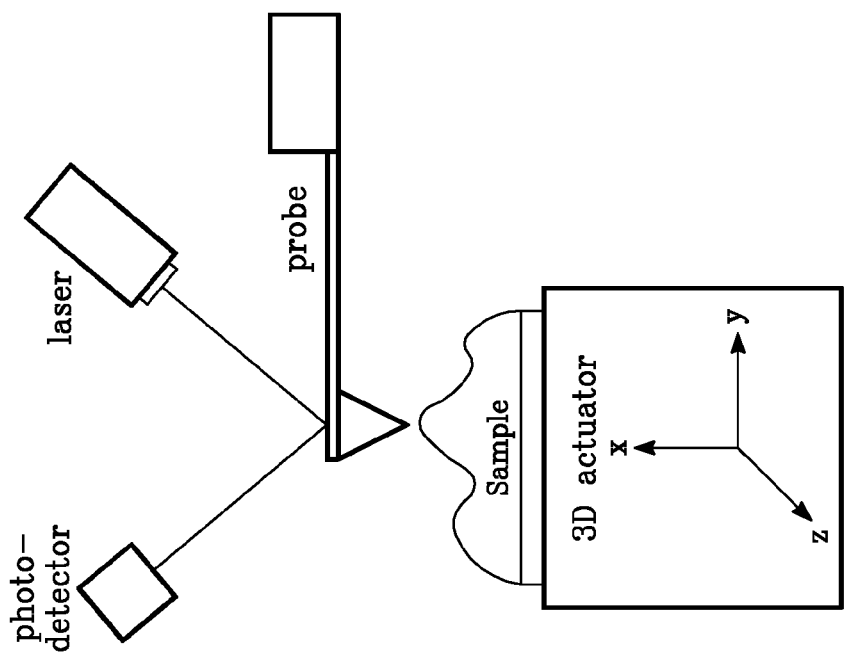
FIG. 1A
FIG. 1B

SCANNING PROBE BASED APPARATUS AND METHODS FOR LOW-FORCE PROFILING OF SAMPLE SURFACES AND DETECTION AND MAPPING OF LOCAL MECHANICAL AND ELECTROMAGNETIC PROPERTIES IN NON-RESONANT OSCILLATORY MODE

BACKGROUND OF THE INVENTION

Field of the Invention

This invention relates to apparatus and methods for operating probe-based apparatus such as profilometers, scanning probe/atomic force microscopes in resonant/non-resonant oscillatory modes, contact/non-contact/intermittent contact, to obtain sampling of data points for imaging surface contours of a sample, and for detection, measurement and mapping of local mechanical and electromagnetic properties of a sample.

SUMMARY OF THE INVENTION

This invention relates to methods for operating probe-based apparatus such as profilometers, scanning probe/atomic force microscopes in resonant/non-resonant oscillatory modes, contact/non-contact/intermittent contactmodes In particular, this invention relates to AFM imaging of surfaces in oscillatory mode, operating away from the resonances of probe and scanner, and to methods for recording and for quantitative on-line and off-line analysis of data related to local mechanical and electromagnetic properties of a sample. In non-resonant oscillatory mode, a vertical piezo-actuator oscillates sample or probe up and down, sinusoidally, over a range of distances from a few nanometers to hundreds of nanometers so that probe tip and sample alternate between touching and non-touching states at a rate different from resonant frequencies of probe and actuator, as FIG. 1 illustrates. In response to tip-force, the probe deflects vertically, and a deflection signal is generated and recorded as shown in the electronic block diagram of a microscope, FIG. 2. FIG. 2 shows a schematic implementation of an AFM in non-resonant oscillatory mode with a standard controller and a high-speed data acquisition module. The oscillatory motion of the scanner in the vertical direction is generated by a periodic voltage applied to the Z-segment of the scanner. Lateral rastering/scanning results from a combination of voltages applied to the X and Y segments of the piezo-scanner.

When a sample is brought vertically into periodic contact with the tip of a cantilevered AFM probe, the probe is deflected, and this deflection is recorded on a photodetector by a laser or super-luminescent diode beam reflected from the cantilever's surface. The related signal of the photodetector is collected by ADC in a high-speed data acquisition module, and processed in real time by FPGA (field programmable gate arrays). A deflection temporal response in non-resonant mode and a periodic Z-motion of the piezo-scanner are shown schematically in FIG. 3. This invention relates to methods for filtering these signals and using them, with/without filtering, to control of such instruments, gentle topography profiling of samples with such instruments, and on-line extraction of quantitative mechanical and electromagnetic properties of such samples.

BRIEF DESCRIPTION OF THE DRAWINGS

The drawings provide examples of the methods of this invention, in which:

FIGS. 1A and 1B, respectively show a schematic representation of atomic force microscopy (AFM), and an illustration of non-resonant oscillatory mode in AFM, where the driving frequency is smaller than the resonant frequency of probe and actuator;

DETAILED DESCRIPTION OF THE DRAWINGS

Before defining specific features of the deflection trace, which are used to extract tip-sample force interactions, and for scanning feedback control, an incoming deflection signal from a photodetector may be filtered to counteract/remove undesirable components, such as those related to noise and artifacts, e.g., probe ringing that may arise in the non-touching parts of the oscillation cycle and wavy background of the whole cycle.

Figure 2:
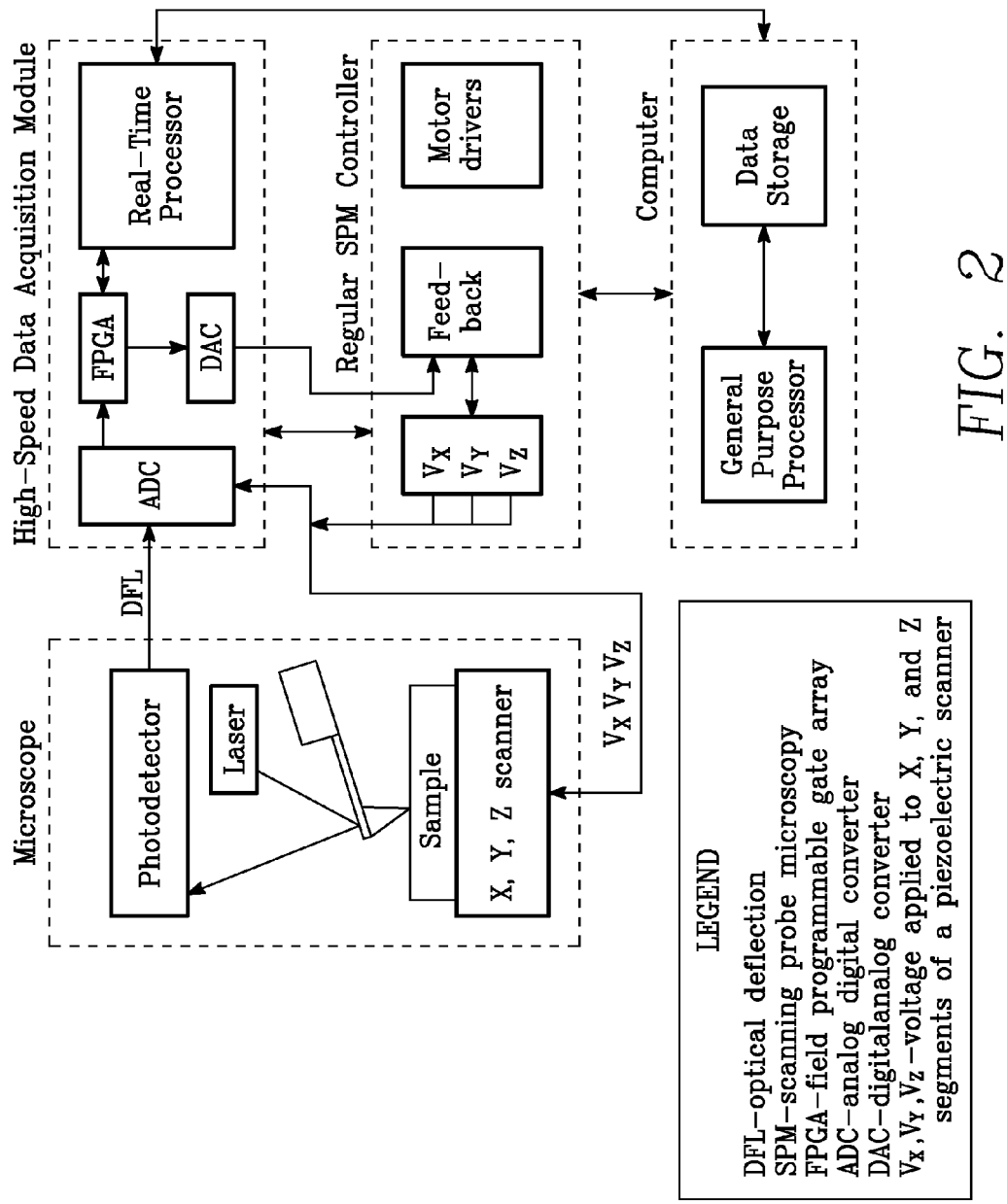
FIG. 2 is a block diagram of an AFM apparatus in non-resonant oscillatory mode.
Figure 3:
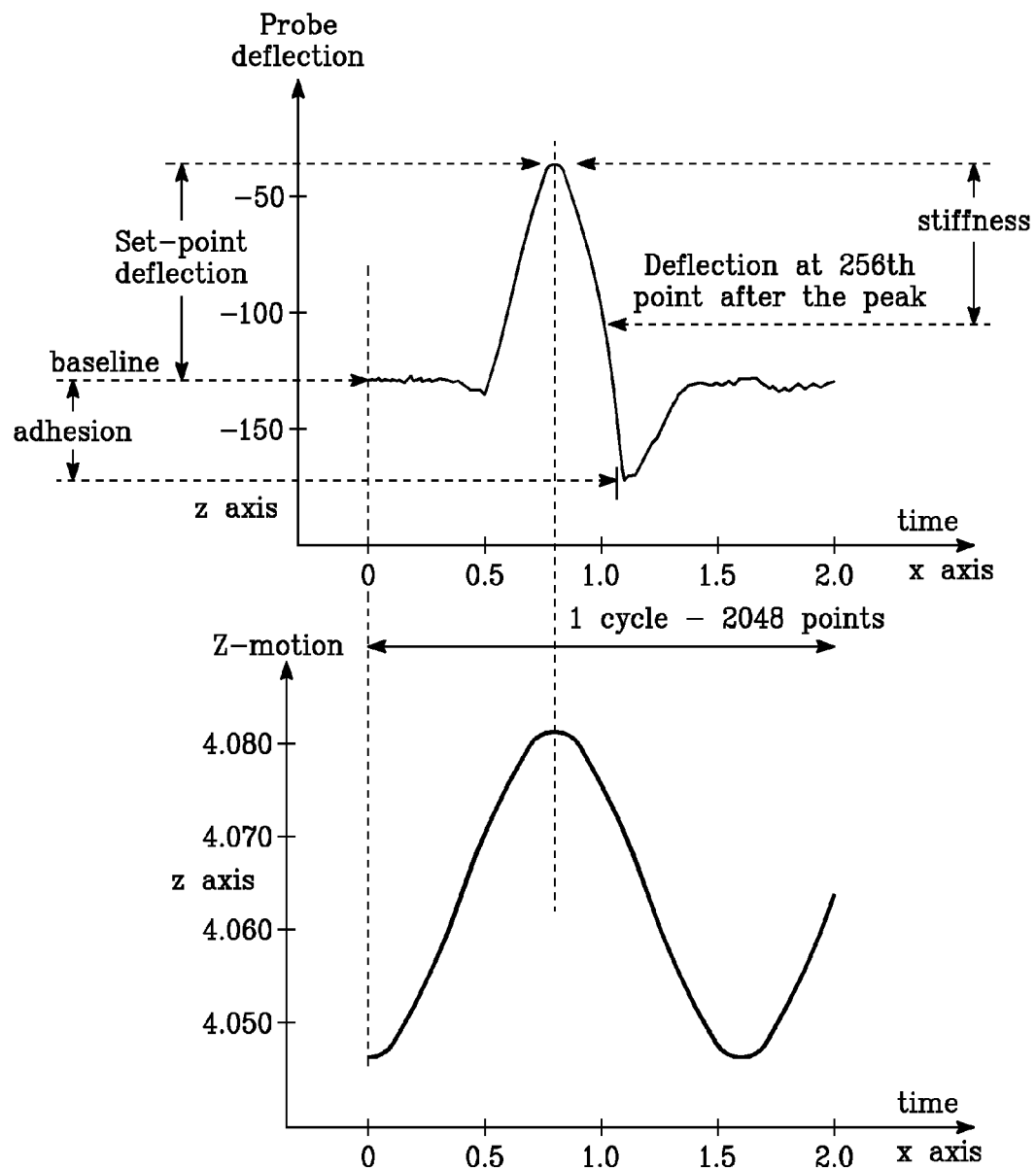
FIG. 3 shows a typical temporal deflection plot, at top, and, at bottom, Z-motion of the scanner or probe.

As FIG. 2 shows, a plurality of coefficients of a filter suitable for removing background signal artifacts pass though a real-time processor, are calculated on the computer, and returned to FPGA. The processed signal passes to DAC, and is applied for the feedback that drives the piezo-scanner, through voltages applied to the piezo-scanner. The feedback operation and driving of the piezo-scanner are performed with an SPM controller. An exemplary device for this purpose is the NT-MDT microscopes with HybridMode controller used as a high-speed data acquisition module. In this case, to obtain a deflection-versus-distance (DvZ) curve, which may be used for on-line and off-line quantitative nanomechanical measurements (QNM), temporal deflection signals D(t) and Vz(t), where Vz is the voltage applied to the Z-segment of the scanner, may be synchronized (FIG. 3). Synchronizing these two signals is used to derive a DvZ curve.

Figure 4:
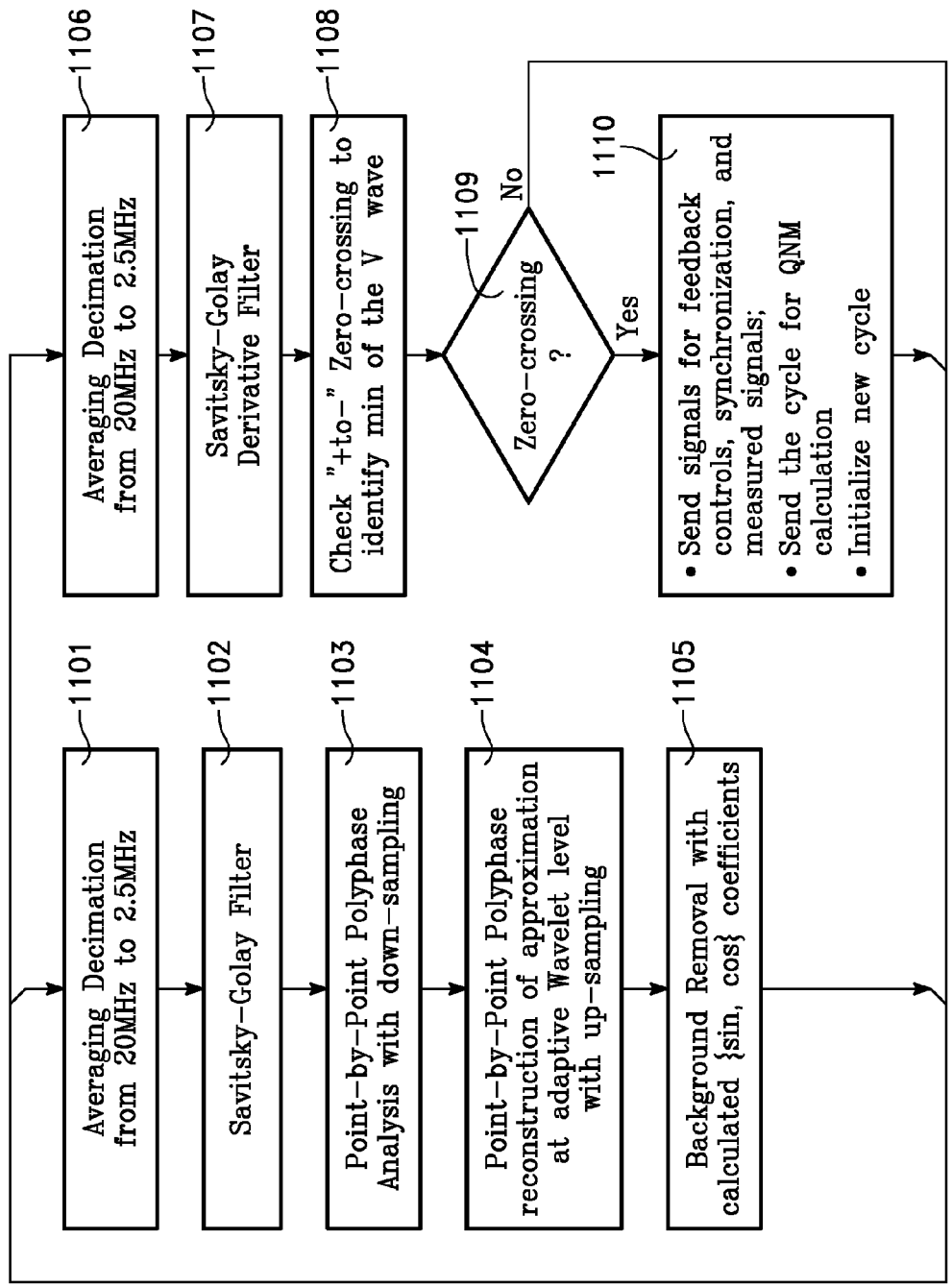
FIG. 4 shows a flowchart with steps for filtering incoming signals, which includes filtering the D(t) signal, and, separately, filtering the derivative of Vz signal and finding its zero-crossing points, which are used for synchronization.

The steps for acquiring incoming signals, and for filtering them, are illustrated in the flowchart of FIG. 4, which includes the filtering of the D(t) signal (1101-1105), and, separately, filtering of the derivative of Vz signal and finding its zero-crossing points (1106-1109), which are used for synchronization. Where the generation of Vz voltage and high-speed acquisition of D(t) signal are performed with a single electronic unit, a second branch may not be needed.

Such real-time filtering of a deflection signal, based on a wavelet method, may remove/minimize undesirable signal noise/artifacts, may assist in recognizing signal features such as peaks, and may also provide multi-resolution time-frequency analysis. In real-time wavelet filtering, an incoming signal is directed into two paths. In each of these two paths, a signal undergoes high-pass and low-pass filtering, followed by down-sampling by two. In the acquisition, a signal is treated as a data sequence collected in time intervals. In the down-sampling, half of this data sequence is removed.

Figure 5:
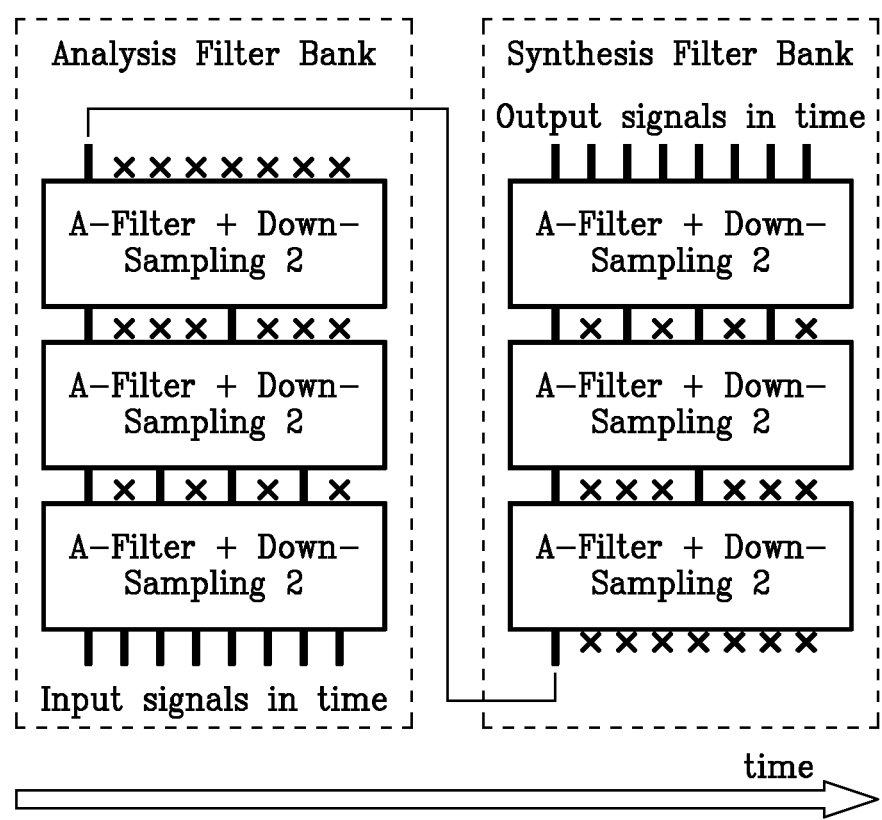
FIG. 5 shows down-sampling and up-sampling of AFM input signals in the real-time wavelet-based filtering.

FIG. 5 shows, schematically, that filtering is followed by down-sampling of this data by 2's, which is repeated 3 times for a signal diverted into the low-frequency filtering path. This down-sampling is called analysis or decomposition and the related filters are known as A-filters. The method following analysis/decomposition is called synthesis or reconstruction. In the synthesis, also shown in FIG. 5, the up-sampling by 2's is performed 3 times, and each time it is followed by filtering with related filters, which are known as S-filters. The output signal includes the same number of components as the incoming signal. Removal of unwanted components in the high-pass or low-pass paths allows multi-resolution filtering. This method may be used in both low-frequency background removal and high-frequency ringing removal in non-resonant oscillatory mode.

The flowchart in FIG. 4, which describes filtering and finding zero-crossing for synchronization for the probe deflection and sample Z-motion, has two branches. In the left branch of this flowchart, the initial averaging decimation from 20 MHz to 2.5 MHz (Processing speed may be higher, e.g. 5 MHz.), at block 1101, reduces signal noise, and increases the time available for the calculations. At block 1102, a Savitsky-Golay filter further reduces signal noise. This filter desirably preserves the high-frequency content of the processed signals, and the deflection curve shape. Blocks 1103 and 1104 remove intermediate parasitic signal frequency components, which are determined by the wavelet level. Such components may include ringing signal contamination.

In FIG. 4, wavelet blocks 1103 and 1104 are followed by block 1105, where background removal from the signal, filtered in blocks 1102, 1103, and 1105, takes place. In FPGA, removal takes place by subtracting a linear combination of sin and cosine with coefficients pre-calculated at block 1207, as shown in Flowchart in FIG. 8. The other branch of the flowchart in FIG. 4 shows that, after initial averaging downsampling of Vz signal, at block 1106, which is needed to reduce the signal noise and to increase time available for the calculations, a Savitsky-Golay Derivative filter, at block 1107, outputs a smoothed derivative of Vz signal. Block 1108 checks whether, in a particular iteration, the derivative signal changes from negative to positive, a zero-crossing event. If not, than blocks 1101-1005 and 1106-1009 repeat. If a zero-crossing is detected, the periodical cycle is complete. Block 1110 follows.

Figure 6:
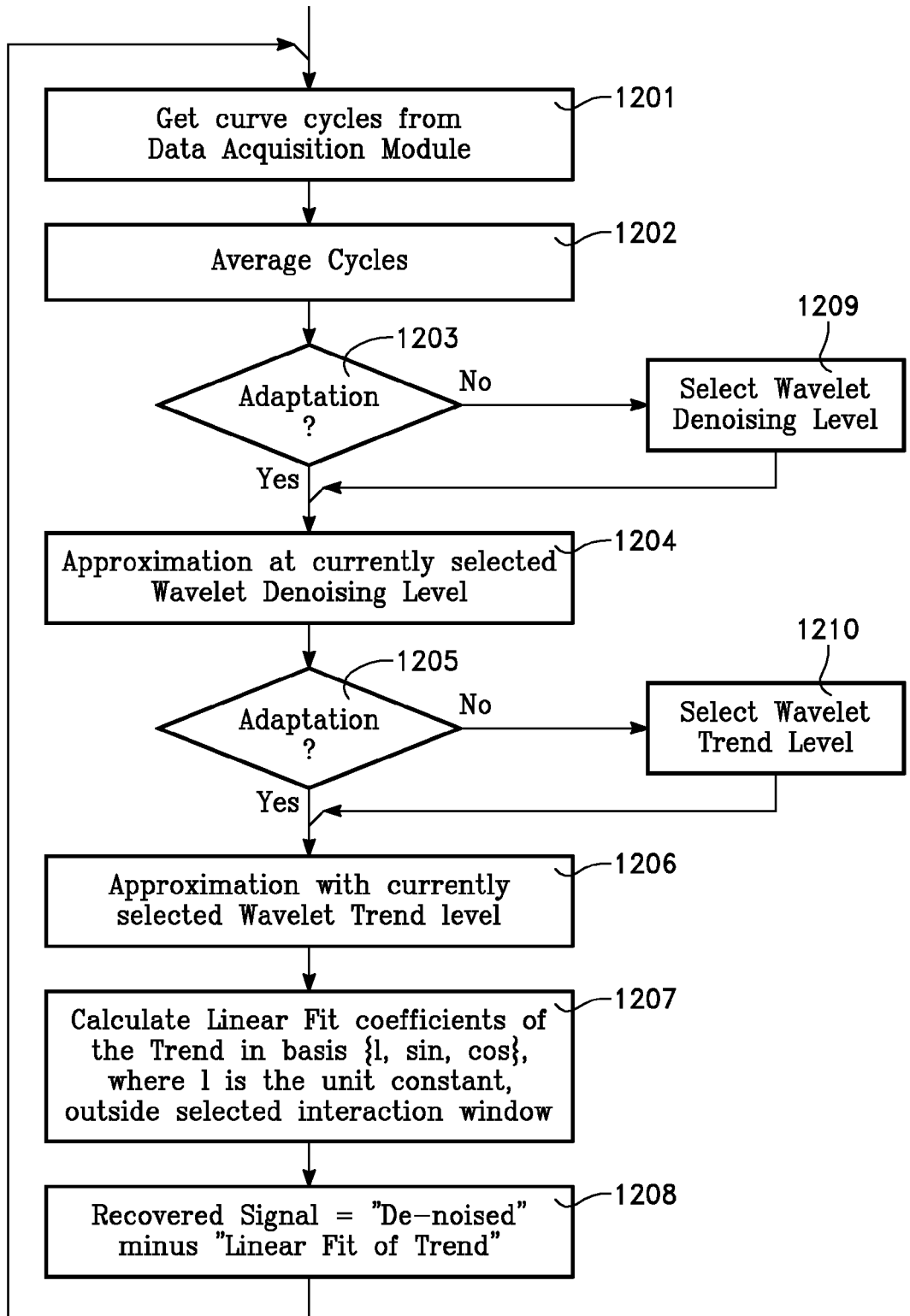
FIG. 6 shows the computer's role in real-time processing for denoising and background removal of incoming deflection signals using wavelet-based filtering.

The flowchart in FIG. 6 shows a computer's role in real-time processing. The computer periodically receives the available cycles containing the curves processed in controller at block 1201. At block 1202, these cycles are averaged. An averaged cycle, if no adaptation takes place at blocks 1203 and 1205, is filtered first by wavelet denoising at block 1204 to calculate "denoised signal" and then by wavelet trend to calculate "trend" that represents background. If adaptation is required at blocks 1203 and 1205, blocks 1209 and 1210 adaptively and/or interactively select the appropriate wavelet levels, denoising and trend, as shown in the flowcharts of FIGS. 7 and 8.

After denoised signal and trend are calculated, the trend is fitted by {I, sine, cosine} basic functions at block 1207, where I is the unit constant. The fit is implemented outside the "force interaction window" where the background is free from the interactive curve. This allows further adjustment of background estimation. The fitting coefficients for {I, sine, cosine} are assigned to FPGA registers to make the background removal, at block 1105, in FIG. 4.

Figure 8:
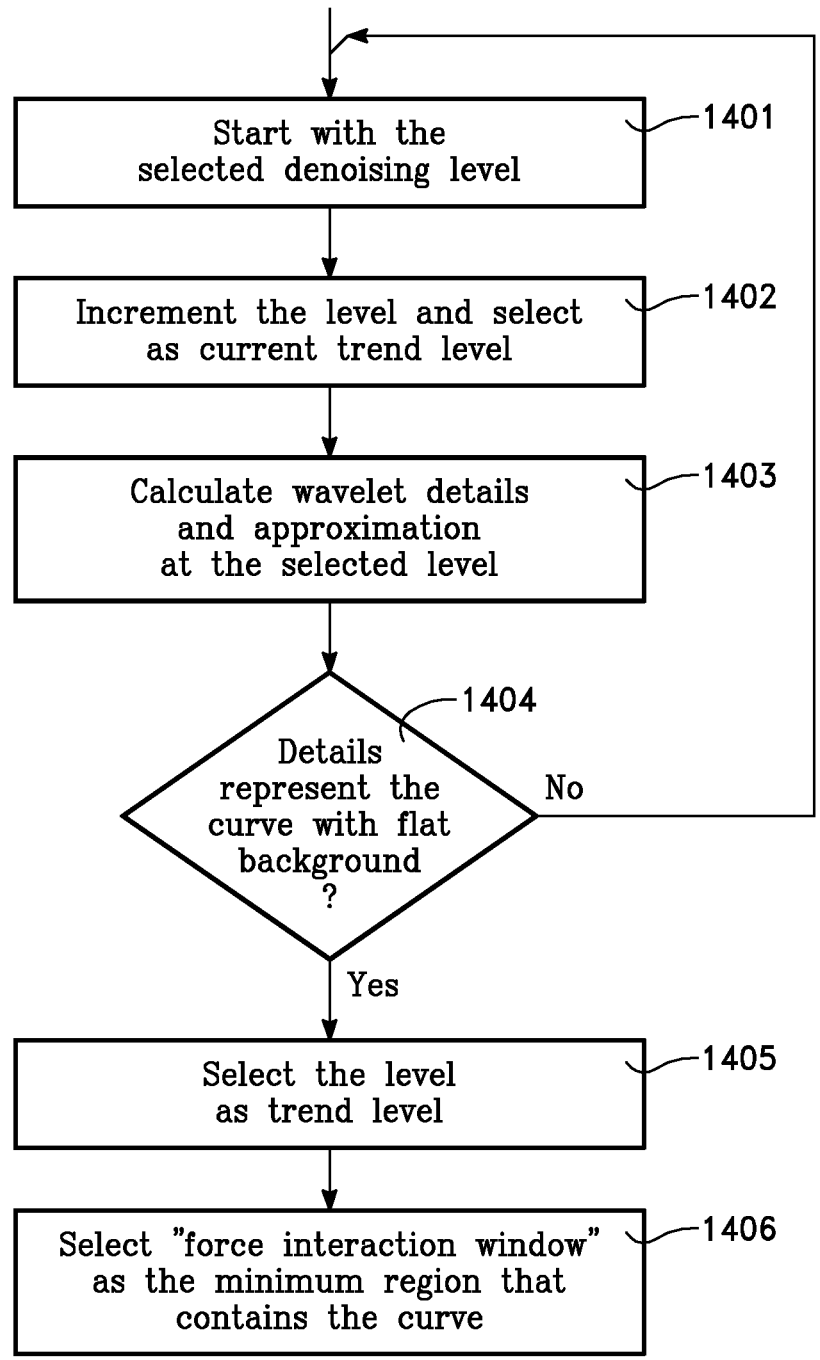
Figure 9A:
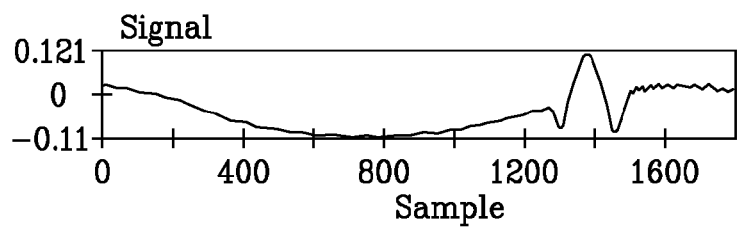
FIGS. 9A, 9B, 9C, and 9D are illustrations of the signals obtained in the method shown in flowchart 2 that performs background removal using adaptive wavelet denoising level 4 and trend level 9 (FIG. 6), where denoising level 4 keeps details within noise bounds of the signal, and trend level 9 separates background/approximation from true curve cycle/details.
Figure 9B:
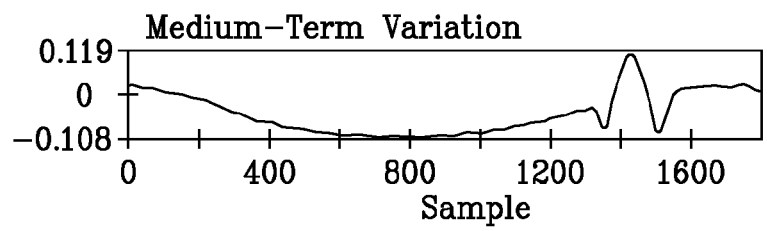
Figure 9C:
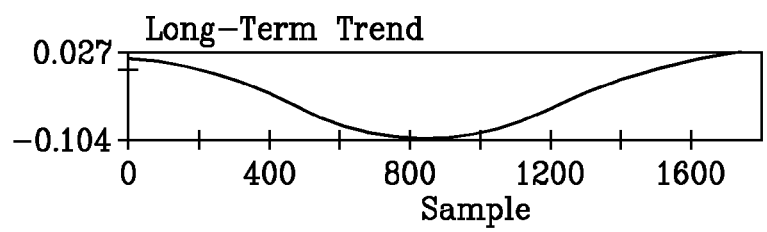
Figure 9D:
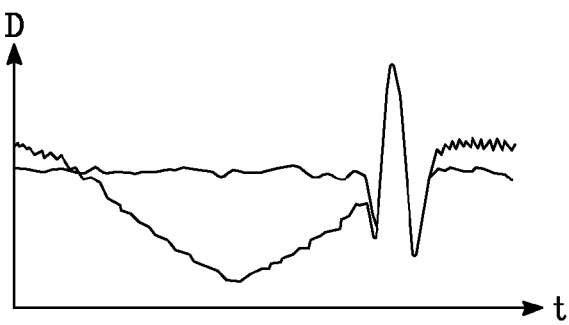
Figure 10A:
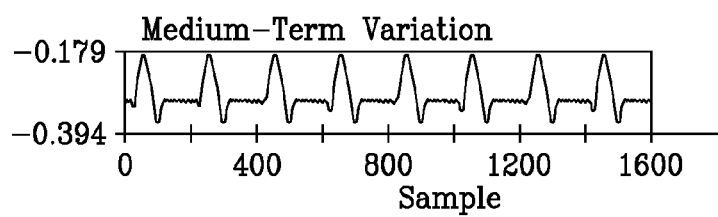
FIGS. 10A and 10B show how the FPGA method shown in FIG. 3A transforms incoming deflection signals to filtered signals using wavelet denoising level 3, including, at top, ongoing filtering during processing at FPGA.
Figure 10B:
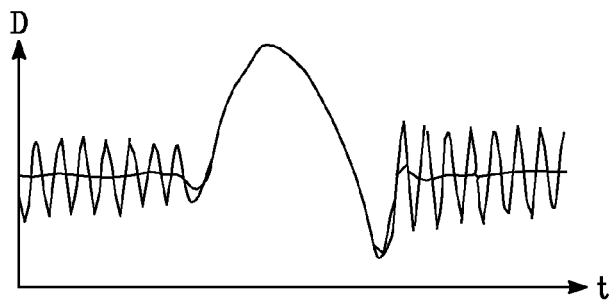

The "force interaction window" can be selected interactively or/and adaptively as shown, for example, at block 1406 in the flowchart of FIG. 8. Recovered signal equal to the difference of the denoised signal and the fitted trend, at block 1208, is calculated for visualization and further processing, e.g. extracting mechanical properties from the AFM's response curve.

Figure 7:
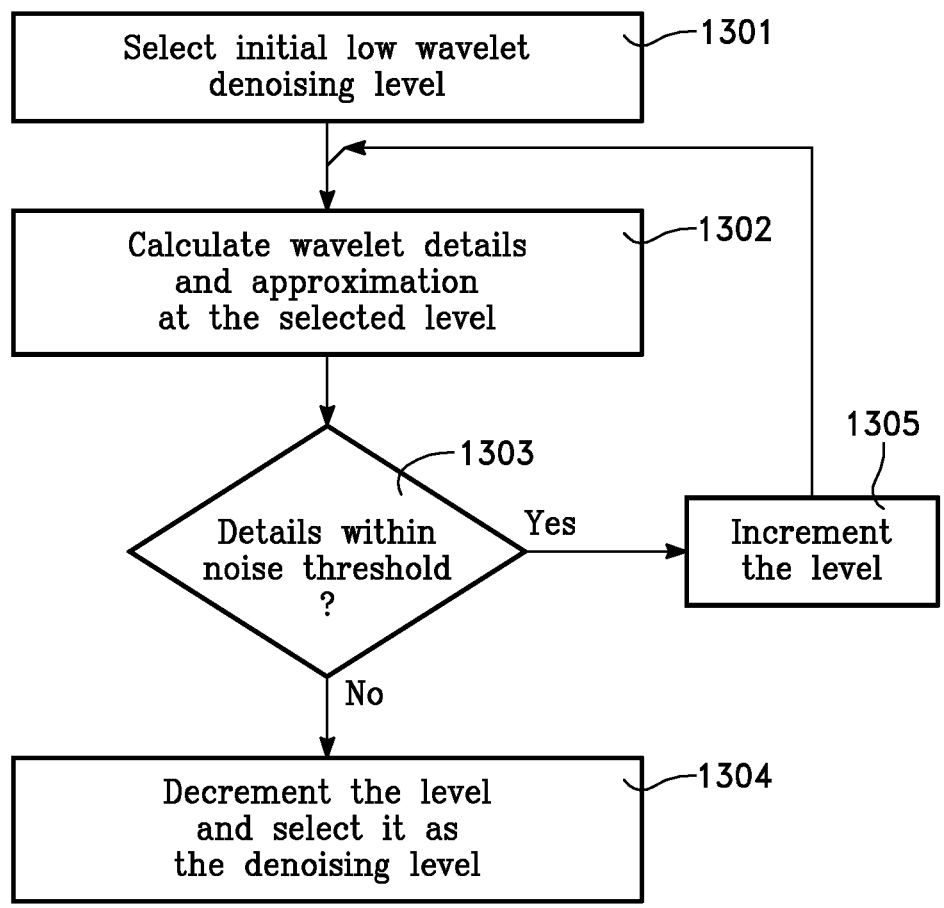
FIGS. 7 and 8 show adaptive and interactive selection of appropriate wavelet levels, denoising and trend, and optimizing wavelet level for separating probe response curve from background.

The flowchart of FIG. 7 shows separation of the signal into approximation and details parts with the optimal wavelet level. The higher the wavelet level, the greater the portion of the signal that goes to details, and the smoother the approximation. The optimal is the highest level where details are within a predefined noise threshold. Block 1301 selects an initial low wavelet level, so that approximation contains most of the signal and details are within noise threshold. The details and approximation at the selected level are calculated at block 1302. If details are within the noise threshold, a higher level is tried, incrementally, at block 1302. Otherwise, as the current level fails to function, the decremented level is used as selected wavelet level for denoising at block 304.

The flowchart in FIG. 8 shows the process of optimizing wavelet level for separating probe response curve from the background. This trend level must be higher than the denoising level because background, where present, represents high amplitude-low frequency components. At block 1401, the flowchart selects denoising level from block (304) and then increments this level at block 1402 until details calculated at block 1403 reasonably represent the force curve at block 1404. Decision making at block 1404 is likewise manual or adaptive. At block 1405, this becomes the selected trend level. At block 1406, the "force interaction window" is selected, manually or adaptively.

Results illustrating wavelet filtering of background and ringing effects are shown in FIGS. 9A, 9B, 9C, 9D, 10A, and 10B. These Figures show that filtering provides contamination-free deflection curves.

This invention also includes methods for optimizing sample surface profiling with probe-based apparatus, such as AFM's and profilometers, operating in contact/intermittent contact, non-resonant modes. These methods are useful for analyzing heterogeneous samples. A feedback mechanism in non-resonant oscillatory mode maintains probe deflection at a constant level in each oscillation cycle. The choice of the set-point deflection influences defining varying-force imaging conditions, allows gentle imaging of soft samples, and also allows examination of local mechanical sample responses, depending upon probe force on the sample. In previous implementations the set-point deflection was measured relative to the background deflection (deflection when the tip was not in contact with the sample). As a minimization of the repulsive force between the most advanced tip atoms and the sample is used for precise and gentle imaging of sample surfaces, the choice of the related set-point deflection depends in part on the nature of the sample/sample locations, and on the operating environment (vacuum, air, liquid). The meniscus forces in air and/or at sticky sample points cause attractive tip-sample forces, shown as an adhesive well in deflection curves. Measuring the set-point deflection relative to the baseline in this case causes the maximum tip surface force to increase, thus slightly distorting the Z height, relative to sample points without these attractive forces. Minimal repulsive force may be attained when set-point level is measured relative to the bottom of the attractive well.

Figure 11A:
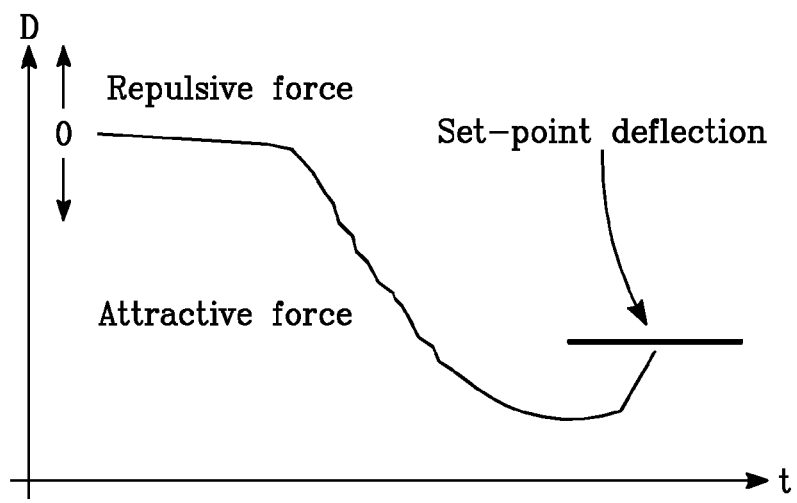
FIGS. 11A and 11B show deflection versus time curves for a sample location with attractive tip-sample interactions (left) and without such interactions (right).
Figure 11B:
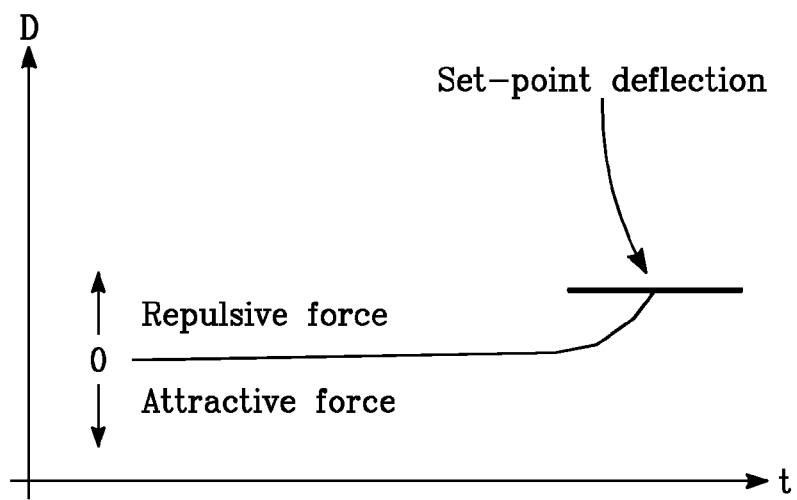

If no well is present, a minimal repulsive force is attained at a set-point near to, and just above the baseline force, as FIGS. 11A and 11B shows. For minimal repulsive tip-sample interaction the set-point should be chosen above and close to the attractive well in the case on left and above the baseline probe deflection (defined as 0-level) in the case on right.

For low-force imaging, set-point deflection should be chosen adaptively, at net attractive or net repulsive forces, at one or more points on a sample, through on-line adjustment of set-point deflection within the same scan. One method for recording precise sample surface contours provides low-force imaging. At each sample point, set-point deflection may be automatically chosen depending on the nature of the sample at this point. At a sticky sample point, set-point deflection may be near to, and slightly above the well's bottom. At a non-sticky point, the set-point may be near to, and slightly above the baseline, preferably by the same net increment as above the well's bottom. The resulting topography image reflects the vertical sample position adjustments that provide the gently-imaged surface profile.

Figure 12:
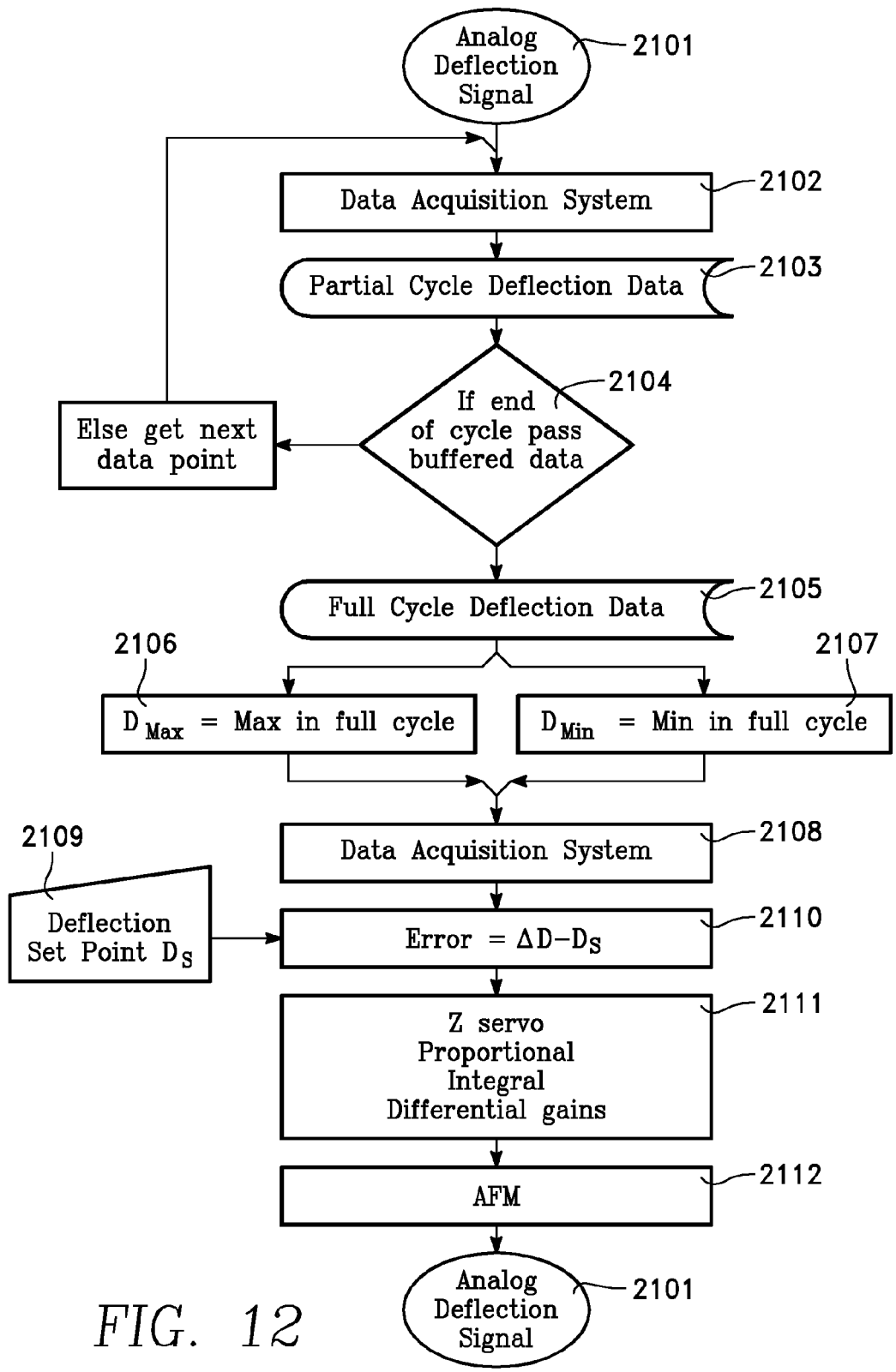
FIG. 12 shows a flowchart for deflection signal collection in a single cycle of non-resonant oscillatory mode as a sample point is moved towards a probe.

The flowchart in FIG. 12 illustrates this method. Steps (2101)-(2105) call for deflection signal collection in a single cycle of non-resonant oscillatory mode as a sample point is moved towards a probe. At blocks 2106 to 2108, maximal and minimal deflections, and their difference, are determined. The difference is compared with the set-point deflection at block 2109. If there is an error, the servo drives the voltage to the Z-segment of the piezo-scanner to move the sample close to the tip and the steps starting with (2101) repeat. When the error (2110) is zero, the probe is moved to another sample point, and the method starts again with (2101).

Figure 13:
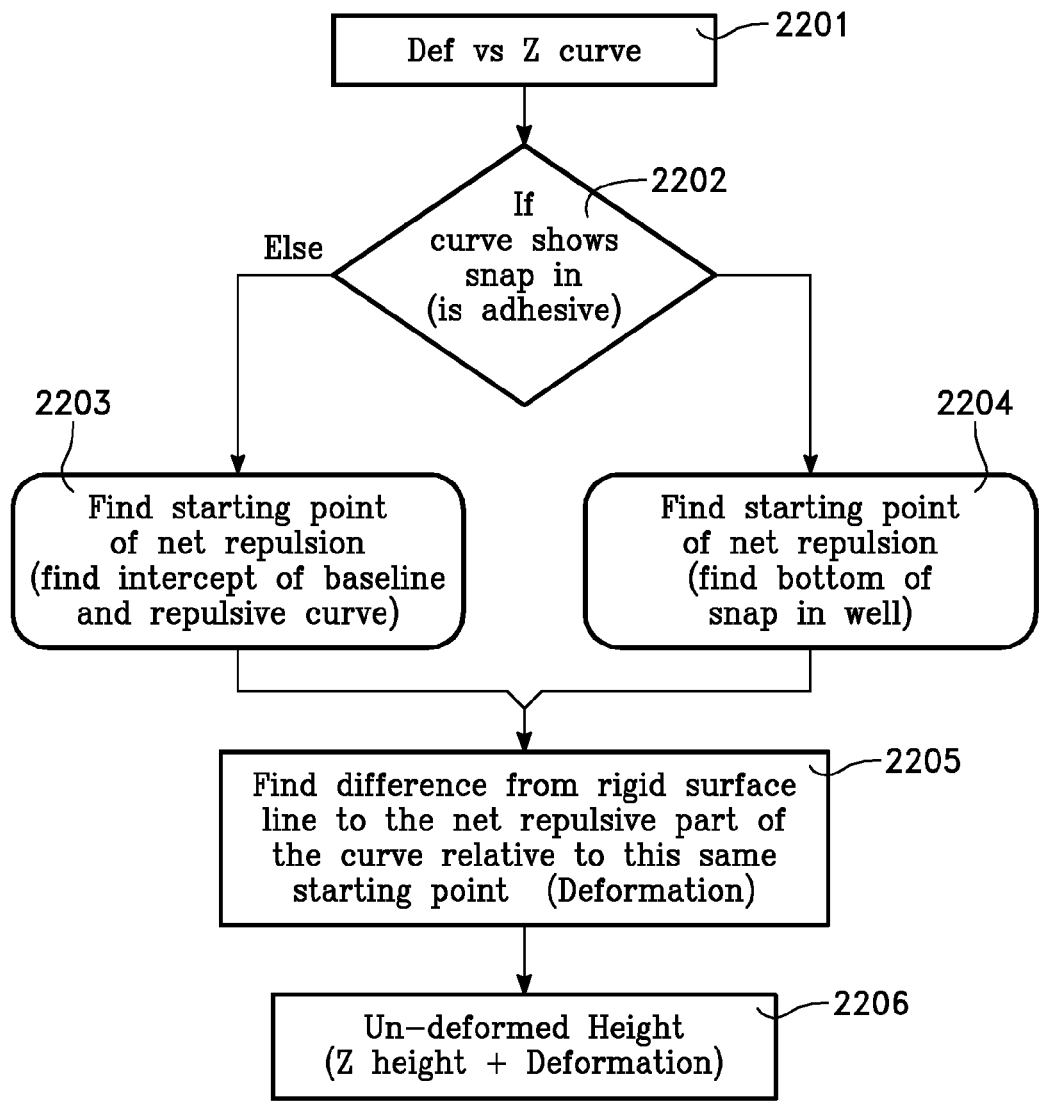
FIG. 13 shows a flowchart describing imaging of all sample points at a constant set-point deflection (Dsp) related in part to higher force contact between probe and sample.

In another method, shown in the flowchart of FIG. 13, imaging of all sample points may be performed at a constant set-point deflection (Dsp) related in part to higher force contact between probe and sample. In this method, the probe may deform the sample point. After the deflection versus distance (DvZ) curve is obtained (2201), it may exhibit the adhesive or snap in well, which is seen in the attractive force part of the curve. Depending on this, the starting point of the net repulsion will be determined (2203, 2204) and the single-point deformation may be calculated (2205) from the difference of deflection-versus-distance (DvZ) curve measured at this point, and DvZ curve detected on a stiff substrate (the latter measurement may be used for calculating optical sensitivity of an AFM). Consequently, the undeformed height point can be found by adding the measured height point at applied Dsp and the calculated deformation value (2206).

Figure 14A:
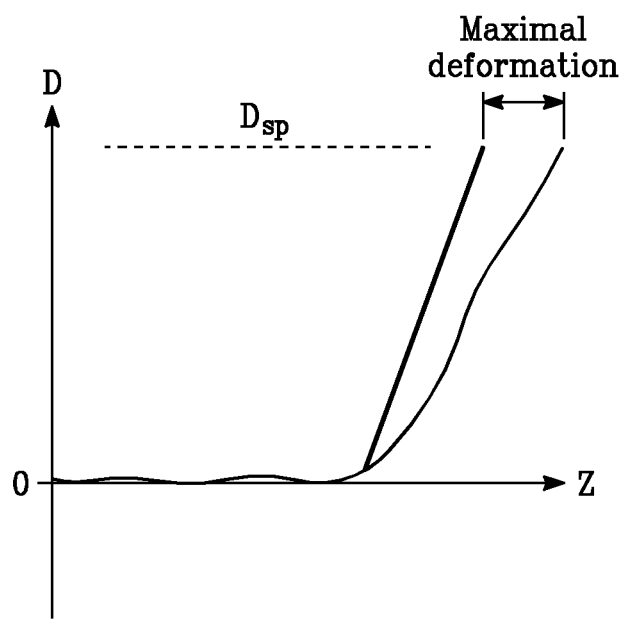
FIGS. 14A and 14B show a desired choice of set-point deflection in DvZ curves in non-resonant oscillatory mode, and ways of determining maximum sample deformation at sample points without adhesive/attractive tip-sample interactions, at left, and with adhesive/attractive tip-sample interactions, at right.
Figure 14B:
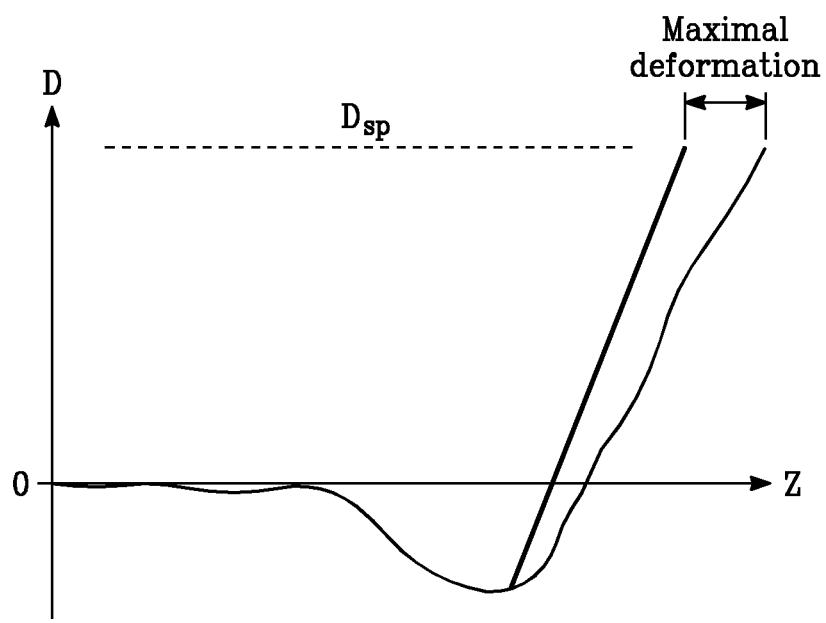

Such measurements of sample deformation at points with different stickiness are illustrated in FIGS. 14A and 14B. These measurements can be done on line and a map of the maximal deformation can be constructed from deformation values determined at a single sample point. A summation of height images recorded in oscillatory mode at a constant Dsp with the map of the maximal deformation may provide an accurate image of sample surface topography.

In addition to such on-line methods for determining accurate maps of sample topography, these determinations may be done off-line, particularly where arrays of DvZ plots collected at different sample points are saved, as in a data file. Such determinations may be performed using Z-vertical displacements of the scanner that correspond to the minimal repulsive force points in the force curves, with or without adhesion of probe to sample. These off-line calculations of the maximal sample deformation can be used to construct deformation maps, and a summation of deformation maps, with height data, to provide accurate surface topography.

This invention also relates to methods for quantitative calculations of mechanical properties of samples and the use of adaptive approaches for studies of heterogeneous samples in on-line and off-line operations of probe-based instruments used for local mechanical testing. The DvZ curves and related load-versus-deformation (Pvh) curves, which are recorded either in AFM-based nanoindentation, stylus nanoindentation or in the non-resonant oscillatory AFM mode, may be applied for calculations of local mechanical properties such as elastic modulus, work of adhesion as well as viscoelasticity and plasticity responses.

DvZ curves may be of four types, depending on the sample's material mechanical response, as FIG. 15 shows. Pure elastic behavior is shown by DvZ curves in FIG. 15A where the loading and unloading traces coincide with each other, reflecting a complete elastic recovery of the deformation. These curves may be used for calculation of elastic modulus (E) of the sample, for example, using the elastic Hertz model.

Figure 15A:
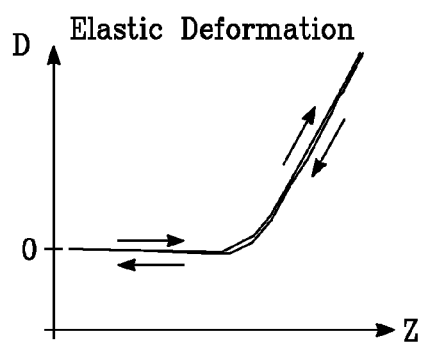
FIGS. 15A, 15B, 15C, and 15D show DvZ curves may be classified into four types, depending on a sample's mechanical response.
Figure 15B:
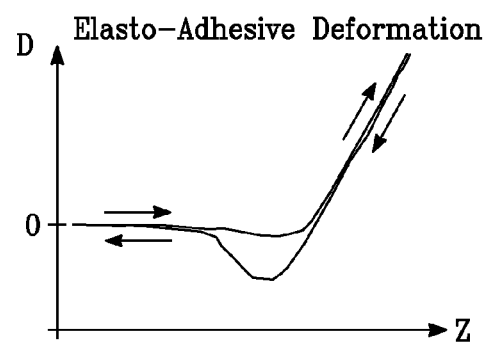
Figure 15C:
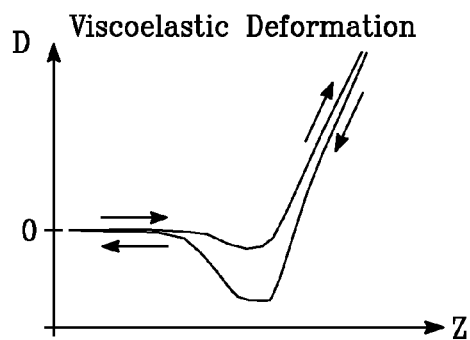

In some cases, adhesive interaction is manifested by the attractive force wells in the loading and unloading parts of the DvZ curves as shown in FIG. 15B. Analysis of these curves may be done in the framework of elasto-adhesive solid state deformation models called DMT (Derjagin-Muller-Toporov), JKR (Johnson, Kendall, Roberts) or Maugis, which provide elastic module E and work of adhesion (W). The viscoelastic material response is illustrated by the DvZ curve in FIG. 15C, in which the slopes of loading and unloading curves are different, signaling dissipative deformation. These curves also depend on time and type of loading. These curves, taken as loading or unloading traces, or as an average of these traces, are often analyzed with the above-mentioned elastic deformation models. These methods may also add calculations of viscoelasticity modulus.

Figure 15D:
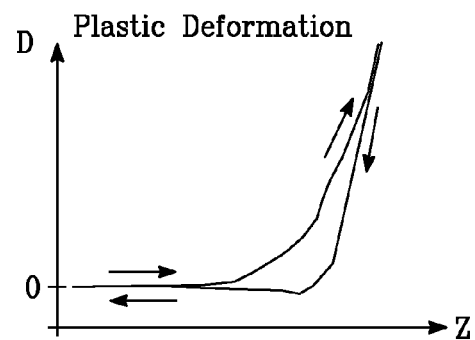

Plastic material response is described by DvZ curves shown in FIG. 15D. Here the slopes of the loading and unloading curves are different, and the probe deflection restores its baseline deflection, the deflection level 0, prior to the point of contact in the loading cycle. The plastic response may be considered as viscoelastic with long term deformation recovery. Analysis of plastic DvZ curves can be performed using the Sneddon integrals method with plastic correction, which allows an extraction of elastic modulus E and the plastic deformation. This approach extends the Oliver-Pharr method.

Figure 16A:
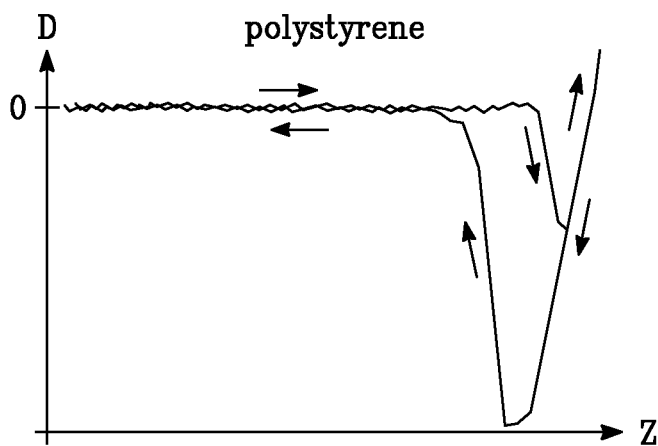
FIGS. 16A and 16B show two examples of DvZ curves obtained on polystyrene (PS) and polybutadiene (PBD) samples.
Figure 16B:
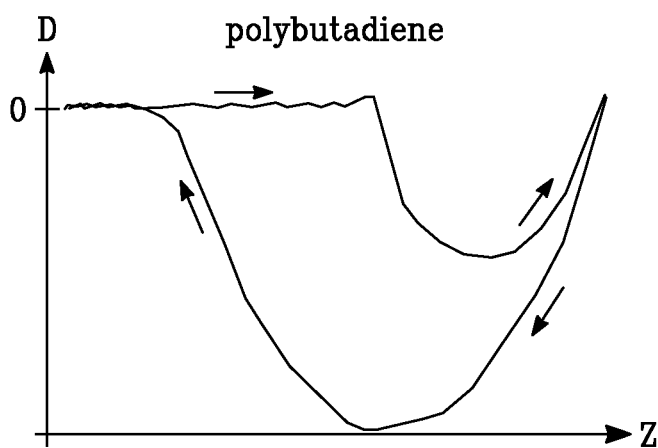

Two examples of experimental DvZ curves obtained on polystyrene (PS) and polybutadiene (PBD) samples appear in FIGS. 16A and 16B. The loading and unloading DvZ curves above the attractive wells coincide for PS and differ for PBD.

Nanomechanical analysis of DvZ curves, which are recorded in non-resonant oscillatory mode, in AFM-nanoindentation, or in stylus nanoindentation, depends in part on the shape of the probe that deforms a sample. AFM probe shape may be described by a formula: $h_{tip}(r)=c(n)r^n$, which shows dependence of tip height at radial position r with two real parameters c and n. The parameter c depends on n, which may be, but need not to be an integer. The coefficient c(n) is described by a theoretical formula for different tip shapes corresponding to n: a conical tip corresponds to n=1; a parabolic (spherical) tip to n=2; a cylindrical tip to n→∞, etc. Tips with other shapes can also be parameterized.

Tip shape affects the elastic tip-sample interaction for a probe characterized by parameters c(n) and n. The relationship between the applied load and sample deformation may be calculated using Sneddon integrals that for the described tip shape provide the following formula:

$$P=B(c(n),n)Eh^m \quad (2)$$

where P is load; h is the sample deformation; E—usually unknown elastic modulus; B—calculated coefficient that depends on c(n) and n; m is calculated by the formula $$m=1+1/n \quad (3)$$

Table A describes the powers n and m for three different tip shapes including those mentioned above:

| Shape Type | Sketch | n | m | Interaction Model |
|---|---|---|---|---|
| Conical | \/ | 1 | 2 | Sneddon |
| Parabolic or spherical | \/ | 2 | 3/2 | Hertz |
| Cylindrical | L_I | ∞ | 1 | Hook |

Figure 17:
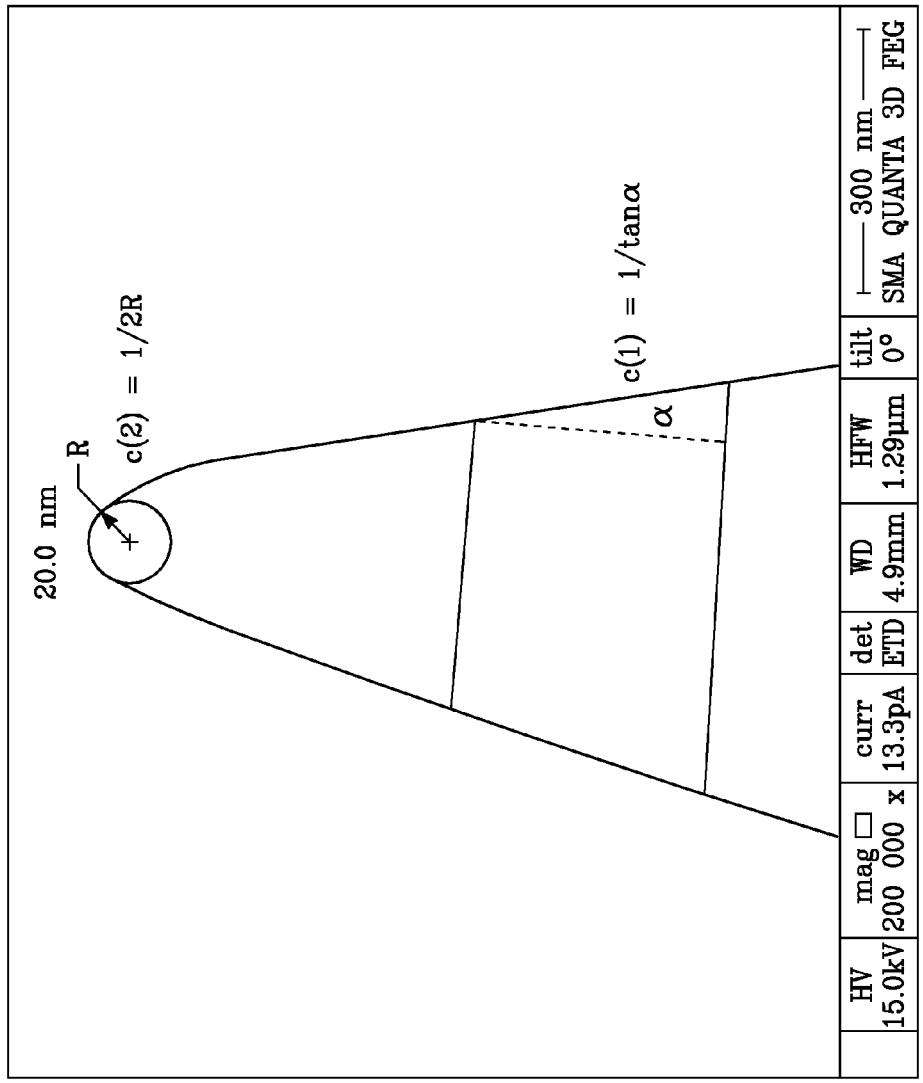
FIG. 17 shows a SEM micrograph of a probe with the contour of tip shape digitized, and used for tip parameterization.

In general, probe shape may differ from those in Table A. However, if a SEM micrograph of a probe is recorded, as seen in FIG. 17, the contour of the tip shape can be digitized, and used for tip parameterization. Tip shape is described by the formula $h_{tip}=c(n)r^n$ and the coefficients c(n) for different n can be found by fitting different parts of the shape. For example, at the tip bottom, the shape can be approximated by a sphere with radius R. For this part of the shape, n=2 and coefficient c(2) can be calculated by formula c (2)=½R. A larger part of tip shape may be considered conical with a half-angle equal to α. For this part, n=1 and c(1)=1/tan α. For parts between these tip portions, tip shape may vary from spherical to conical, and may be described by choosing n in the interval between 1 and 2 and finding the related c(n). The found function c(n) provide tip-shape parameterization. This process may be automated to include a large number of points on the tip. For each point, n and c(n) may be calculated by an optimal fit of the selected part of the tip shape. For intermediate n, c(n) can be interpolated.

To determine on-line or off-line quantitative calculations of sample mechanical properties, besides probe shape, one needs to know the spring constant of the probe and the optical sensitivity of the instrument, which may be determined by the measurements of the DvZ curve on a rigid substrate such as sapphire or diamond. Quantitative analysis begins with filtering and processing of D(t) and Z(t) traces, and a reconstruction of DvZ curve. Once the curve is obtained it should undergo a pattern recognition procedure that helps assigning the curve to one of 4 types: elastic, elasto-adhesive, viscoelastic or plastic, see the flowchart in FIG. 18.

Figure 18:
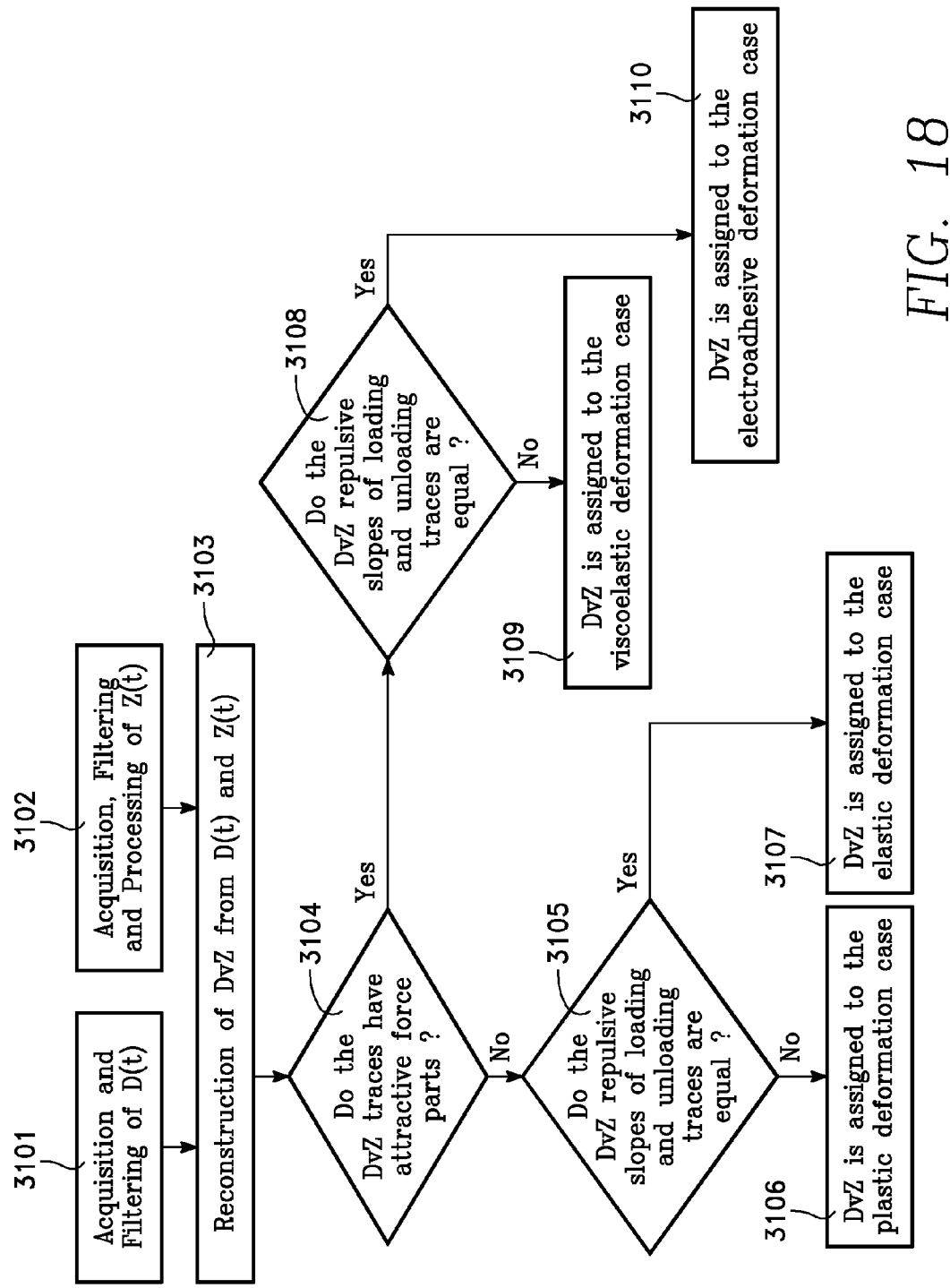
FIG. 18 shows a flowchart for reconstructing a DvZ curve, and assigning the curve to one of four types: elastic, elasto-adhesive, viscoelastic or plastic.

As FIG. 18 shows, after filtering and processing of D(t) and Z(t) signals (3101 and 3102), these signals are used to reconstruct the DvZ curve (3103). This curve is analyzed for attractive force parts (3104). If such parts are absent, then the slopes of the repulsive parts of the loading and unloading traces are compared (3105), and the curve is assigned either to the plastic deformation case (3106) or to the elastic deformation case (3107). If the attractive parts in the DvZ are present then the slopes of the repulsive parts of the curves are compared (3108). When these slopes in the loading and unloading parts are identical, then the DvZ curve is assigned to the elasto-adhesive deformation (3109). Where these slopes are different, the curve is assigned to viscoelastic deformation (3110).

Figure 19:
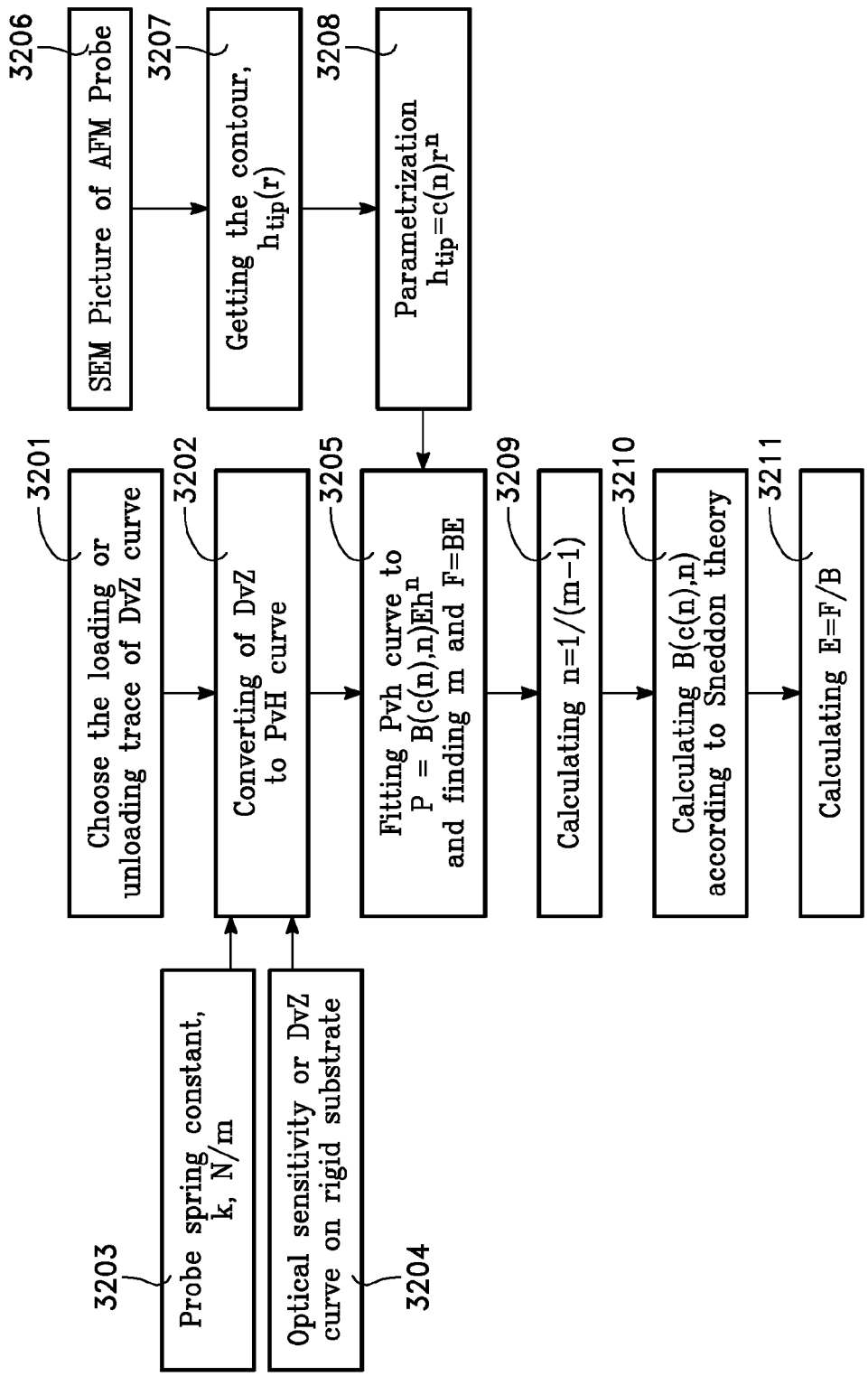
FIG. 19 shows a flowchart for calculating elastic modulus of a sample from DvZ curve assigned to an elastic deformation case.

The calculation of the elastic modulus of a sample from DvZ curve assigned to the elastic deformation case is performed as described by the flowchart in FIG. 19. This procedure is adaptive to the parameterized tip. The chart starts by choosing either loading or unloading DvZ curve for further processing (3201). In the conversion of DvZ to Pvh (3202), the preliminary acquired data characterizing the probe spring constant (3203) and optical sensitivity, are measured from DvZ acquired on a rigid substrate (3204). Step (3205) determines adaptive fit of Pvh curve by the equation (2) using the tip parameterization based on its SEM micrograph (3206-3208). Block 3209 uses the theoretical relationship between m and n to calculate n. At block 3210, n is used to calculate B. At block 3211, elastic modulus is obtained.

The analysis of the adhesive interactions may be based on DMT and JKR models, which are generalized and connected in Maguis approach. These models include the elastic and adhesive constituents in the load and deformation equations.

$$\begin{cases} P(a) = P_{elast}(E, c(n), n; a) + P_{adh}(E, W; a) \\ h(a) = h_{elast}(c(n), n; a) + h_{adh}(E, W; a) \end{cases}$$

For the elastic part, the Sneddon integrals applied to the parameterized tip shape with c(n) and n provide the following formulas:

$$\begin{cases} P_{elast}(E, c(n), n; a) = E \frac{2n}{n+1} \beta(c(n), n) a^{n+1} \\ h_{elast}(c(n), n; a) = \beta(c(n), n) a^n \end{cases}$$

where $\beta$ (n, c) is calculated by a formula derived from applying the Sneddon integrals to the parameterized tip. The adhesion part depends on the selected model. As examples, $$\begin{cases} P_{adh}(E, W; a) = \begin{cases} \sqrt{8\pi a^3 EW}, & JKR \\ 2\pi WR, & DMT \end{cases} \\ h_{adh}(E, W; a) = \begin{cases} \sqrt{2\pi aW/E}, & JKR \\ 0, & DMT \end{cases} \end{cases}$$

Figure 20:
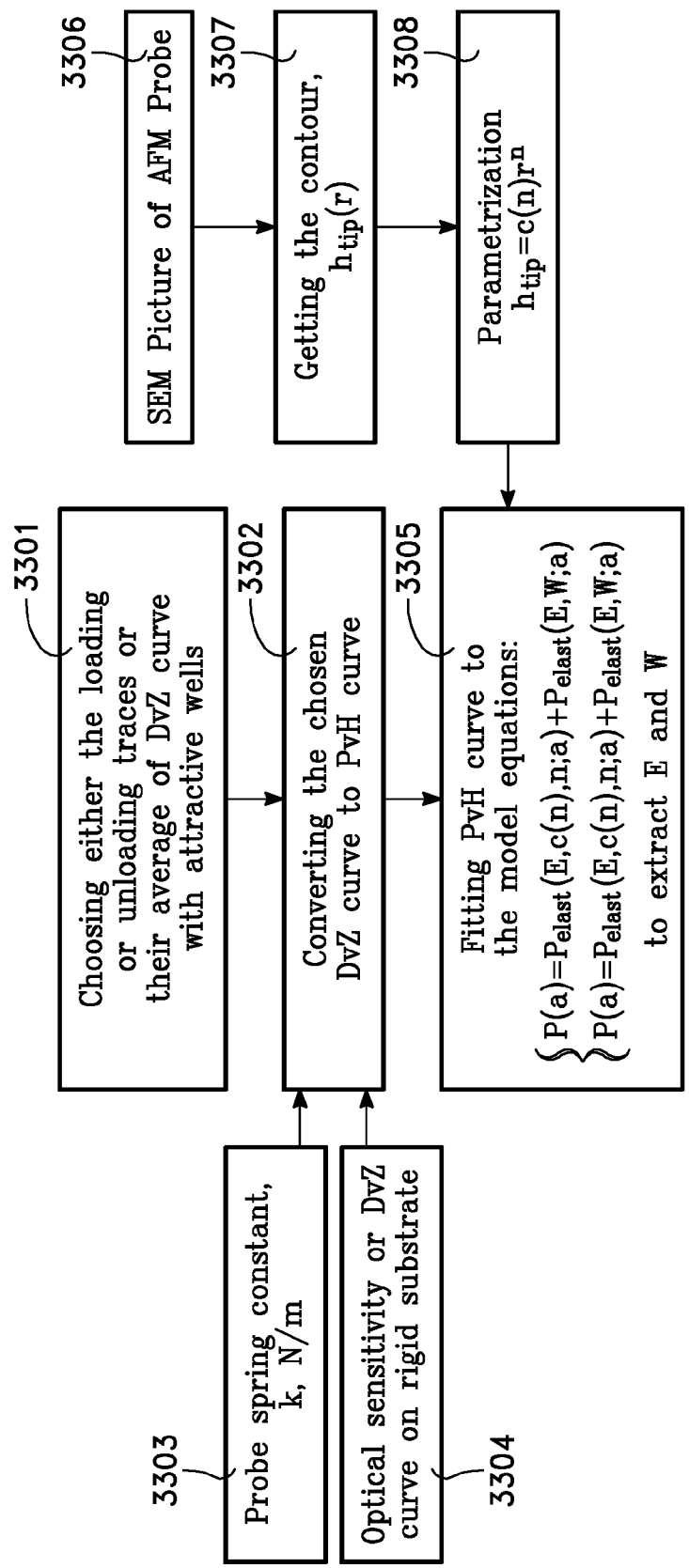
FIG. 20 shows a flowchart for calculating elastic modulus and work of adhesion for elasto-adhesive deformation.

The calculations of the elastic modulus and work of adhesion for the elasto-adhesive deformation are performed as shown in the flowchart in FIG. 20. Most of the blocks (3301-3304, and 3306-3308) are parallel to those in FIG. 19. Block 3305 deals with the fitting of Pvh curves to equations used for extraction of elastic modulus and work of adhesion.

When dealing with the DvZ describing the viscoelastic behavior two approaches may be used. In the first approach, the DvZ curves, either the loading or unloading ones, or even an averaged one, may be treated with elastic or elasto-adhesive modes, as described above. In this case the time dependent character of viscoelastic deformation is ignored. Estimates of time-dependent characteristics of viscoelastic materials, however, may ignore adhesion. For example, such materials may be analyzed using a 3-parameter solid model, where model initial compliance J(0) and derivative of creep compliance J'(t) are described by following formulas:

$$J(0) = \frac{p_1}{q_1}; \quad J'(t) = \lambda \frac{q_1 - q_0 p_1}{q_0 q_1} e^{-\lambda t},$$

where $q_0$, $q_1$, $p_1$ and $\lambda = q_0/q_1$ are known parameters of this model describing viscoelastic solids. The more common viscoelastic complex modulus E'+iE" may be calculated from these parameters by known formulas.

Figure 21:
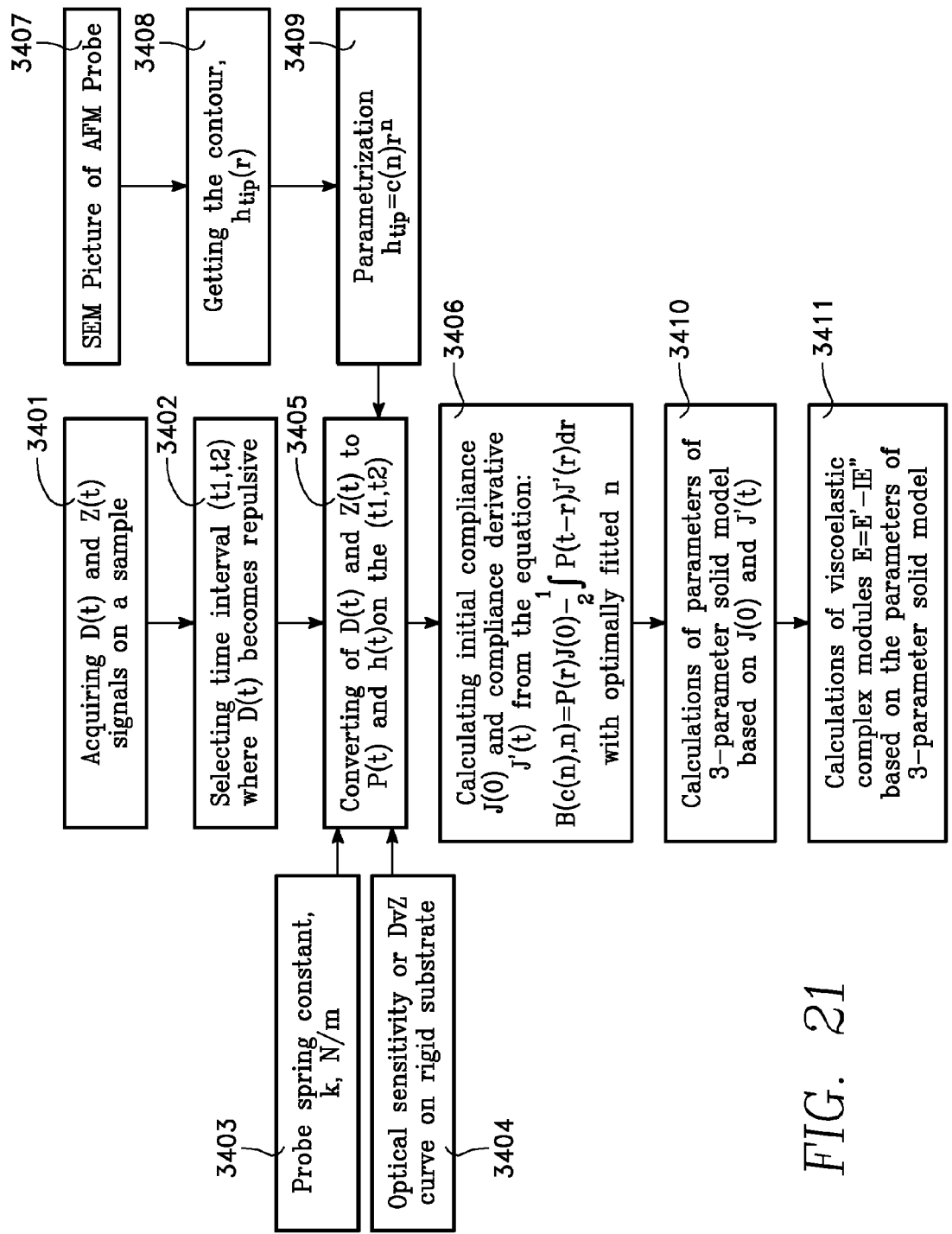
FIG. 21 shows a flowchart for calculating modulus for viscoelastic deformation.

The flowchart in FIG. 21 describes the procedure for calculating the complex viscoelasticity modulus. After acquiring the temporal deflection D(t) and Z(t) signals at (3401), a time interval [t1, t2] is selected in the repulsive part of the D(t) curve (3402). At (3405), the D(t) and Z(t) signals are converted to P(t) and h(t) using spring constant (3403) and optical sensitivity (3404) and taking into account that h(t)=Z(t)−D(t) where D(t) is converted to metric units using optical sensitivity. At step (3406), initial compliance J(0) and compliance derivative J'(t) are calculated with optimally fitted parameter n taken from the analysis of the tip shape in (3407)-(3409). Once known, J(0) and J'(t) may be used for calculations of the parameters of the 3-parameter solid model describing the sample viscoelasticity (3410). At step (3411) these parameters are used to calculate viscoelasticity modulus. Other viscoelasticity models can be used instead of the 3-parameter model.

Figure 22:
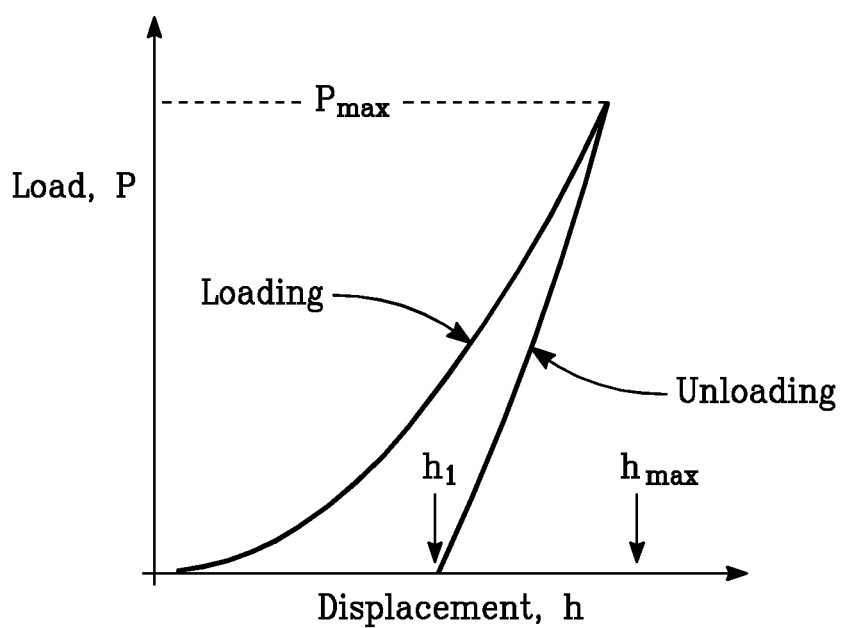
FIG. 22 shows analysis of DvZ curves arising from plastic deformation.
Figure 23:
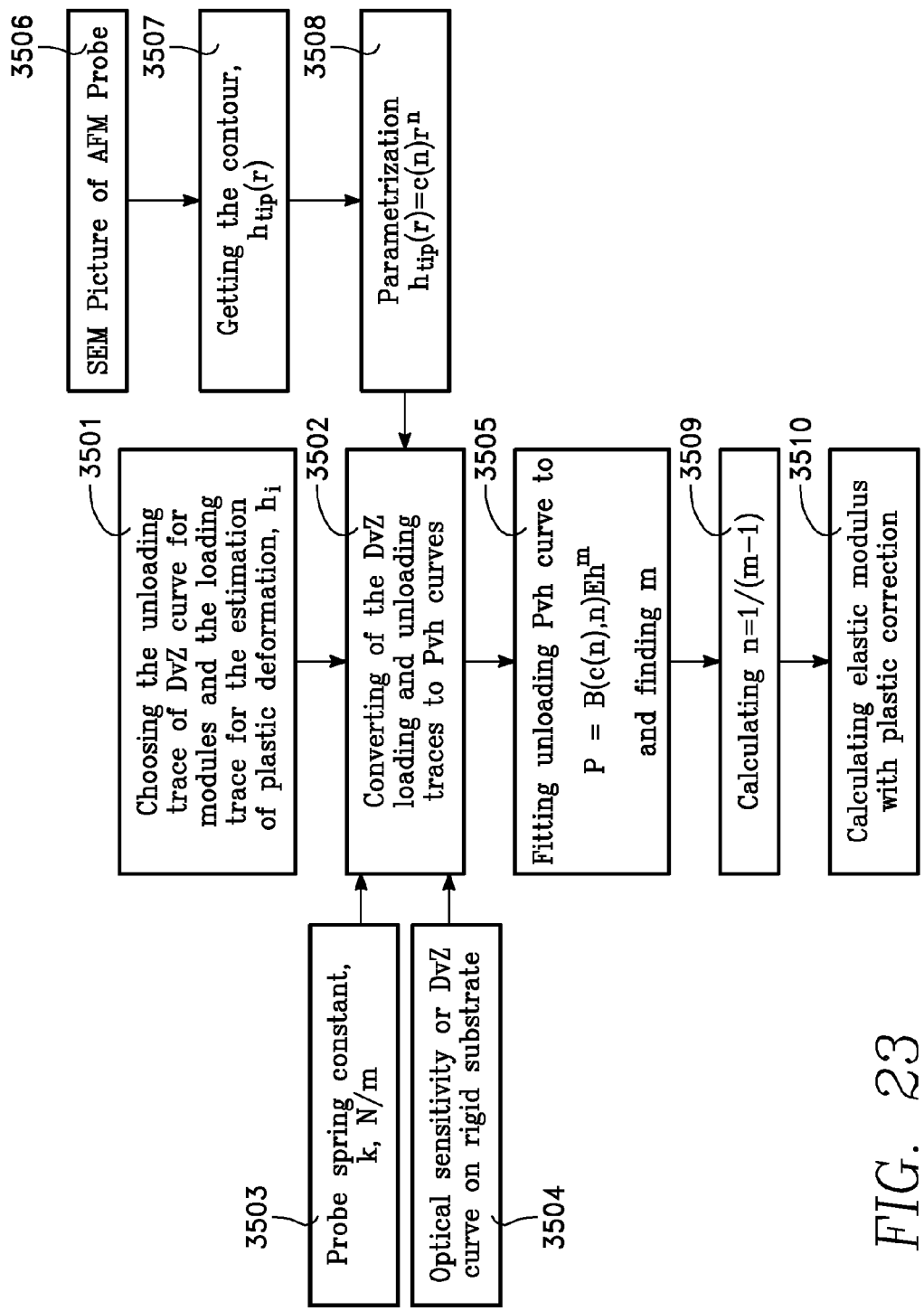
FIG. 23 is a flowchart showing steps for choosing unloading and loading traces, which are used, respectively, for modulus calculation and estimation of final plastic deformation $h_f$.
Figure 24:
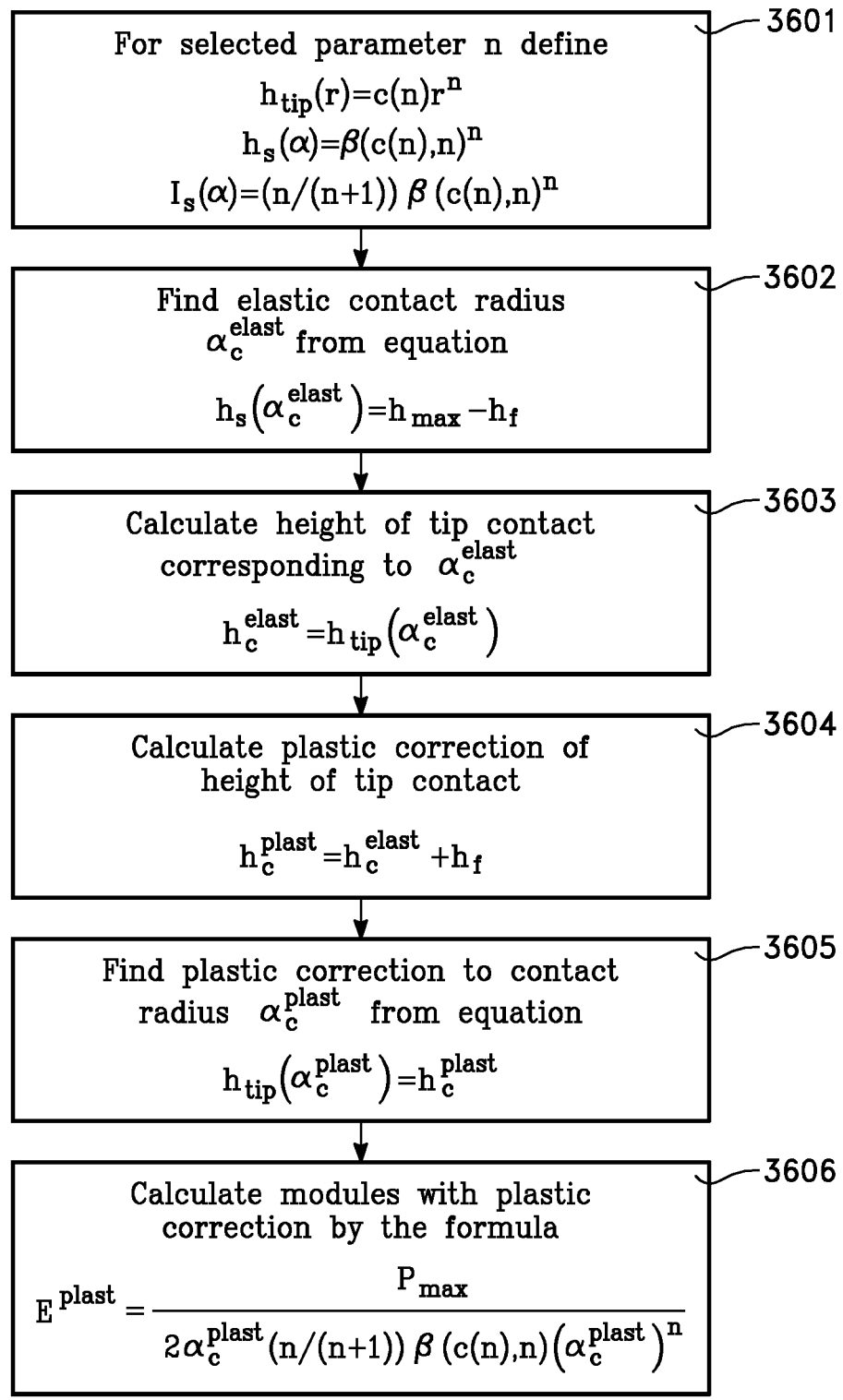
FIG. 24 shows a flowchart for calculating elastic modulus with plastic correction.

Analysis of DvZ curves arising from plastic deformation may be determined as follows. Maximal deformation ($h_{max}$) and final plastic deformation ($h_f$) of a sample are defined in FIG. 22, where loading and unloading traces of the plastic deformation are sketched. The flowchart in FIG. 23 describes the steps starting with a choice of the unloading and loading traces, which are used, respectively, for modulus calculation and estimation of $h_f$ (3501). Conversion of the DvZ traces to Pvh curves (3502) is performed as in analysis of the elastic case with the use of the probe spring constant (3503) and optical sensitivity (3504). The steps 3505-3509 are identical to the calculations of the elastic deformation for the unloading trace (3205-3210). Block 3510 is related to the calculation of the elastic modulus with plastic correction, which is described in detail in the flowchart in FIG. 24. This flowchart includes the definitions of the functions ($h_{tip}$—the adapted tip contour for the n calculated in 3509); $h_s$ and $I_s$—the expressions for Sneddon integrals for the $h_{tip}$) used in the consequent blocks. The calculations steps appear in blocks 3602-3605. The elastic modulus with plastic correction $E^{plast}$ is calculated in 3606.

The DvZ curve recognition and calculations of the local mechanical properties, which are described in the flowcharts in FIGS. 18-21 and 23-24 may be carried out in real-time or off-line. The ability to perform real-time calculations can serve as the basis of the online adaptive method in which the calculation of mechanical properties in a sample location can be performed using the model best suited for this location. These methods may be used for any probe based technique, in which the DvZ curves or similar dependencies are collected.

This invention also relates to methods of measuring tip-sample electromagnetic and electro-mechanical interactions in the non-resonant oscillatory mode of operation of a probe-based apparatus. When alternating between non-touching/touching parts of an oscillatory cycle, such a probe senses mechanical interactions during touching, and also electromagnetic forces, as when conducting or ferromagnetic coatings are applied to the probe and when a bias voltage is applied between probe and sample. For example, electric current between the bias probe and sample can be measured in the touching part of the cycle.

The probe detects these forces during touching/non-touching parts of an oscillatory cycle. Such forces in non-resonant oscillatory mode appear as a change of probe baseline in response to electromagnetic or magnetic active points on a sample. Despite the demonstrated probe sensitivity to the electromagnetic forces in the non-resonant oscillatory mode, the extraction of probe responses to such interactions and reduction of cross-talk between mechanical and electric effects can be achieved by measurements at specific frequencies using lock-in amplifiers and PLL (phase-locked loop) schemes with devices that track signal changes at a particular frequency and detect frequency changes precisely.

The new methods are useful in piezoresponse force microscopy (PFM—a AFM method for studies of piezo-resistive materials) and Kelvin force microscopy (KFM—an AFM method for quantitative studies of surface potential) in non-resonant oscillatory mode.

Figure 25A:
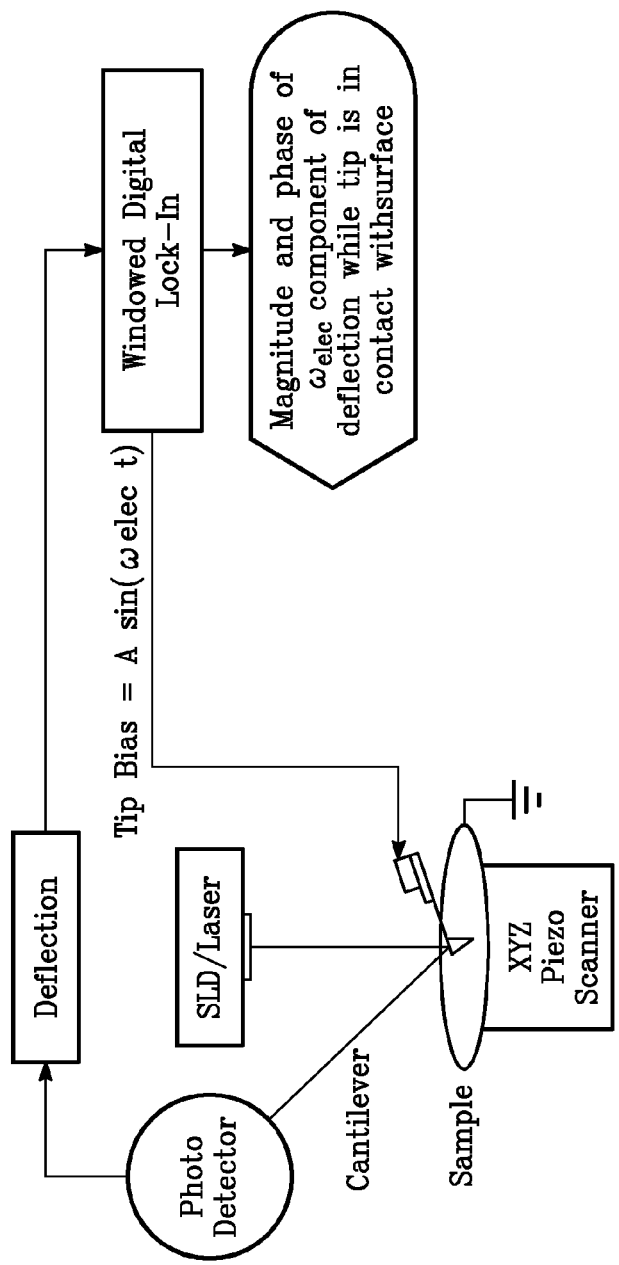
FIGS. 25A and 25B show the set-up for piezo-response microscopy measurements in the non-resonant oscillatory mode, and, at bottom left, probe deflection with higher frequency overlay due to the probe response to piezo-strain in the touching part of the D(t) cycle.
Figure 25B:
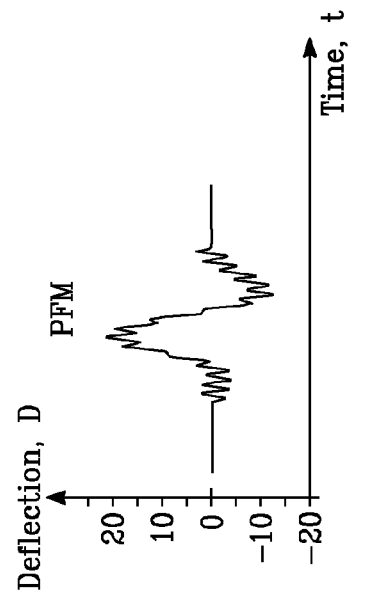

PFM is a contact mode method in which changes of sample dimensions as a function of periodically applied voltage (electric modulation) cause piezo-electric strain to be measured at the frequency of the applied voltage. In non-resonant oscillatory mode, the probe deflection may be detected in the touching part of the D(t) cycle as shown in FIGS. 25A and 25B, showing such an instrument. When the probe leaves a sample, its deflection reflects the electrostatic force, but this signal is undesirable for evaluation of the piezoresponse. However, piezo-response may be measured with a windowed lock-in amplifier that detects the signal only in the touching part of the oscillatory cycle. Data may be obtained during a short contact window where the frequency of the electric modulation is sufficiently high to have one or more full cycles during contact time. Preferably, output low pass filters pause between contact times.

The sample motion reflecting the piezo-strain can have components in all three dimensional axes depending on the orientation of the crystal domain with respect to the tip-sample electric field. Sample motion may occur in vertical and lateral directions, and these motions may be detected by signals from different segments of the photodetector. These methods may use multiple lock-in amplifiers to detect vertical and lateral piezoresponse effects, and/or may use multiple lock-in amplifiers that are tuned to multiple frequencies if electric excitation is performed at two or more frequencies and if piezoresponse is to be recorded at the electric modulation frequency, and at its harmonics.

Figure 26:
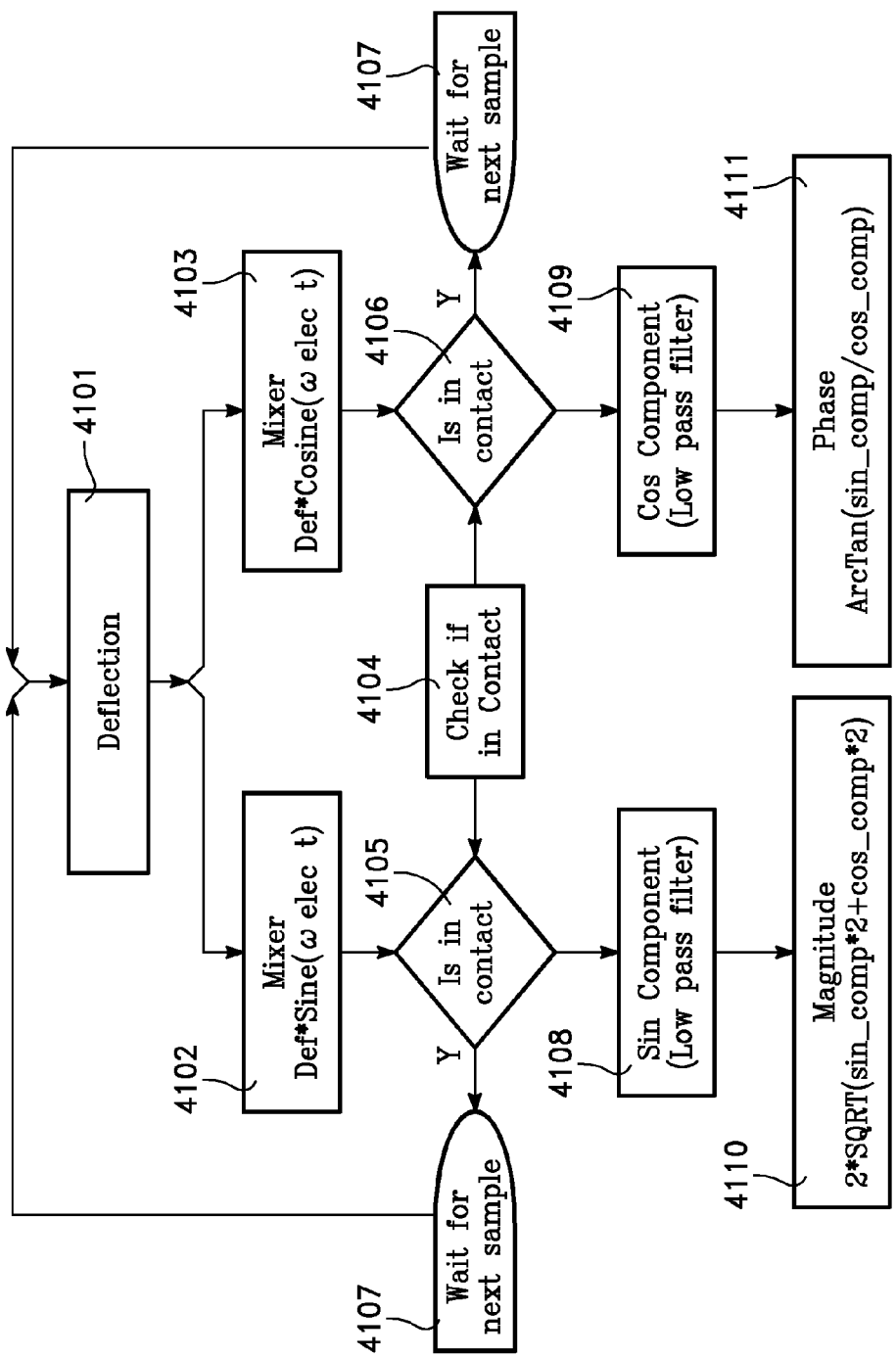
FIG. 26 is a flowchart describing a measurement procedure for PFM studies in non-resonant oscillatory mode.

The flowchart in FIG. 26 illustrates a measurement procedure for PFM studies in non-resonant oscillatory mode. The sequence of events, in each oscillatory cycle, include obtaining the deflection signal (4101) and sending it to the mixers (4102, 4203) where it is multiplied with sine and cosine components of the electric modulation (a periodical voltage between the probe and the sample) at the frequency $\omega_{elec\,()}$. This is a standard method to measure the signed phasor magnitude of the two orthogonal components of the deflection signal at the frequency $W_{elec}$. Further, as contact of probe and sample is verified (4105 and 4106), signals from the mixers are directed to the low pass filters (4108 and 4109). This is a unique aspect of this lock-in demodulation, only passing the signal for calculating the two phasor magnitudes during the window when the tip is in contact. Magnitude and phase of the piezo-electric effect is calculated in (4110 and 4111). The magnitude and phase signals, which are measured at individual sample points, are used to construct magnitude and phase maps, or maps of other related signals.

In KFM, local measurements of surface potential may be done by measuring electrostatic force, or its gradient, between probe and sample, which is enhanced by electric modulation. The KFM servo nullifies this signal by adding offset voltage equal to the difference of surface potentials of the probe and sample materials. In so-called amplitude modulation KFM (AM-KFM), servo drives the DC component of the tip bias voltage to nullify the component of the deflection signal, at the modulation frequency $\omega_{elec}$. In doing so the DC potential applied to the tip may equal the contact potential difference between the tip and surface. In non-resonant oscillatory mode, these measurements may require the frequency of electric modulation to be sufficiently high to have one or more full cycles during non-contact time. Electrostatic forces are insignificant while the tip is in contact with a sample so there is no signal to measure.

Preferably, we avoid charge transfer between tip and sample during contact. We prefer to hold the tip at the contact potential difference previously measured, so tip and sample are at the same potential, to eliminate tip-sample current, and the modulation voltage is not applied during contact. The AM-KFM procedure in non-resonant oscillatory mode, which satisfies the above-mentioned requirements, may be based on use of a windowed lock-in amplifier.

Figure 27:
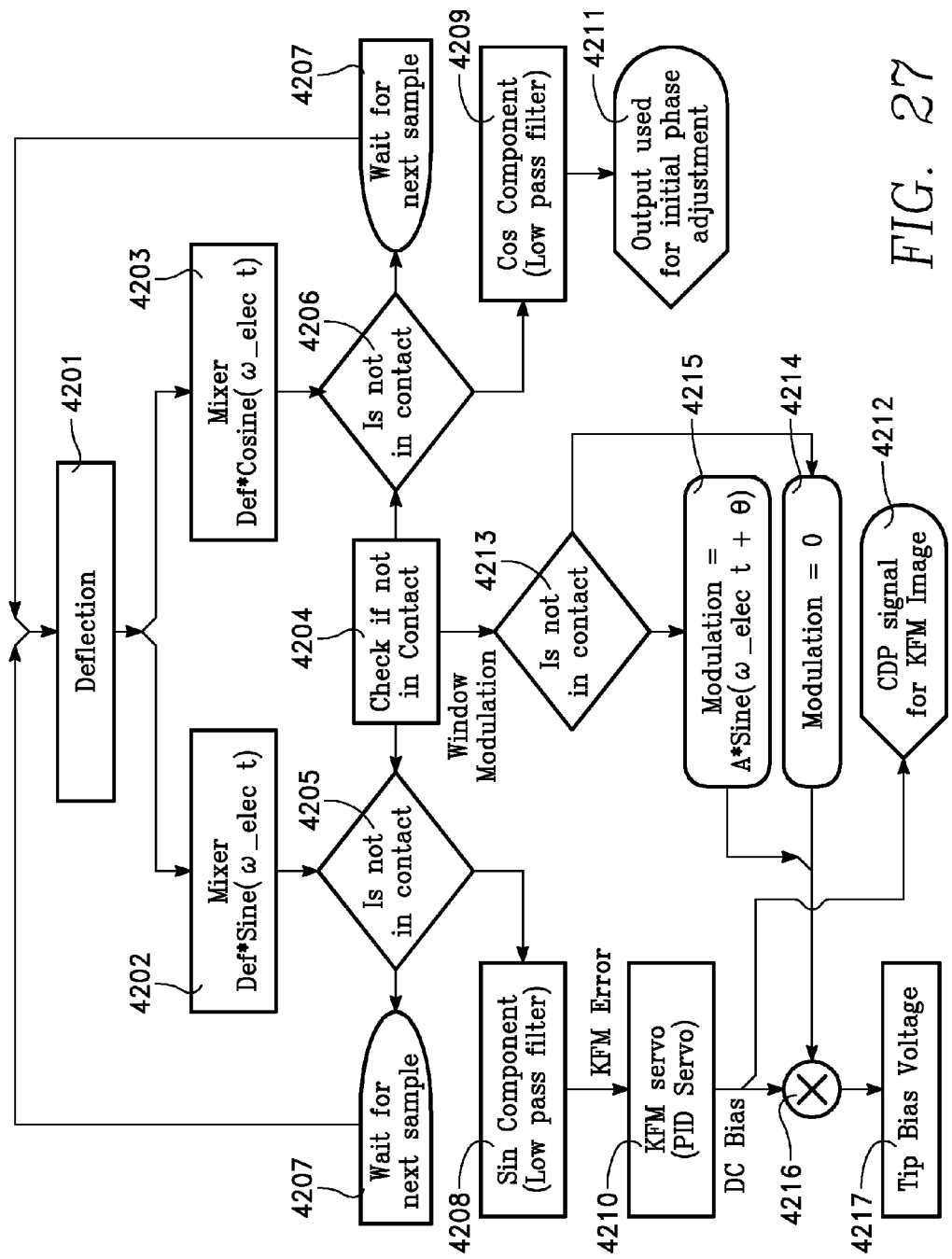
FIG. 27 is a flowchart for implementing AM-KFM technique in non-resonant oscillatory mode.

The flowchart in FIG. 27 shows steps implementing AM-KFM technique in non-resonant oscillatory mode. The acquired deflection signal (4201) is sent to mixers (4202, 4203), and there is multiplied with sine and cosine components of the electric modulation at the frequency $\omega_{elec}$. Further, as the non-contact of the probe with a sample is verified (4204-4207) the signals from the mixers are directed to the low pass filters (4208 and 4210) and used afterwards for the KFM servo (4210) and for initial phase adjustment in (4211). From the KFM servo, the detected surface potential difference, or contact potential difference (CPD), is used to construct the related image in 4212. The same signal is also applied as DC bias to the summation in 4216. Here this signal is added to the one coming from the window modulation part in 4213-4215. Here, modulation is "off" (4214) when the tip is in contact with the sample, a touching part of the oscillatory cycle, and modulation is "on" (4215) when the probe is in the non-touching part of the cycle. The summation of the modulation signal with DC bias in 4216 provides the tip bias voltage in 4217, which brings the sample and the probe to the same potential during the contact.

Figure 28:
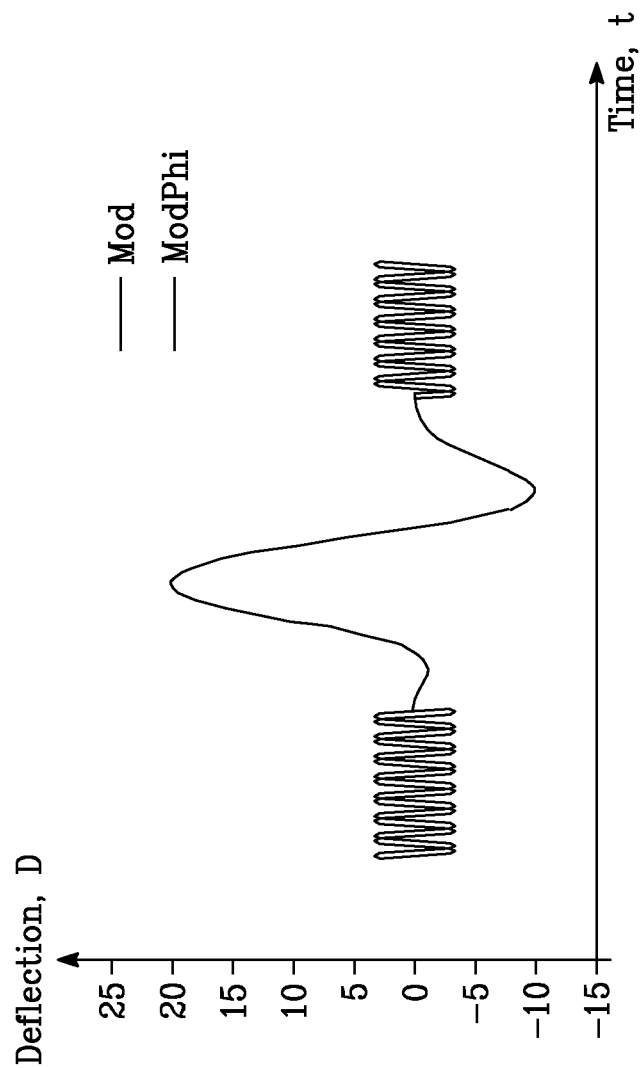
FIG. 28 shows that frequency of cantilever ringing after cantilever and sample separate, is affected by the electrostatic force gradient, which may be measured as a frequency shift.
Figure 29:
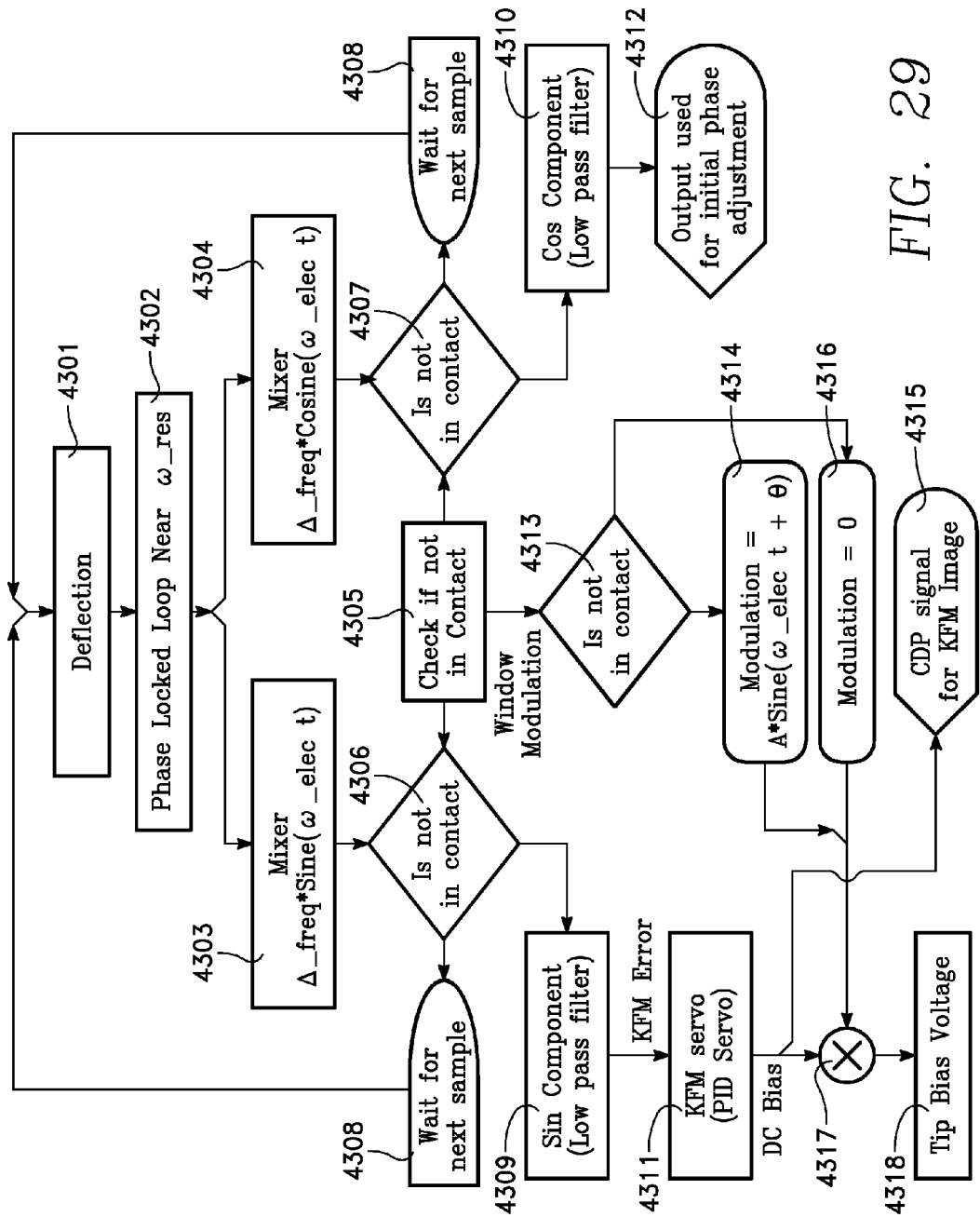
FIG. 29 is a flowchart for implementing FM-KFM operation in non-resonant oscillatory mode.

In addition to AM-KFM, surface potential measurements can be attained in frequency modulation (FM) technique, which is known as FM-KFM. The difference between these methods is in use of electrostatic force gradient instead of the electrostatic force as the servo signal for nullification of the difference between surface potential of tip and sample. As FIG. 28 shows, the frequency of the ringing of the cantilever, after the cantilever separates from sample surface, is affected by the electrostatic force gradient, which may be measured as a frequency shift. A PLL electronic scheme provides sensitive detection of frequency changes, and may be used for operation of FM-KFM in non-resonant oscillatory mode, as the flowchart in FIG. 29 shows. This flowchart is similar to the one describing the AM-KFM mode, but adds a PLL block 4302, which provides frequency shift to the mixers, and to the KFM servo. As with AM-KFM, window modulation avoids surface potential difference and undesired current flow during tip/sample contact in oscillatory mode.

To minimize thermal drift in probe-based apparatus such as AFM's, and to improve signal-to-noise ratio of AFM detection, this invention provides a thermally-stable cabinet/casing for such apparatus, in which the temperature of the AFM frame is kept constant by controlling power supplied to a heater or cooler located inside the cabinet/casing, and by using heat convection/chimney effect to draw air over a heat exchanger to control the temperature inside the cabinet/casing.

In some embodiments, a temperature sensor is placed on the AFM instrument inside the cabinet/casing. A heater inside the cabinet/casing raises the AFM temperature 3-4 degrees above room temperature, with a stability of ~0.1 degrees when room temperature varies in the 2-3 degrees range. Alternatively, the AFM's temperature may be lowered with a Peltier cooler —to maintain a temperature a few degrees lower than room temperature. Alternatively, using such heaters and coolers together permits heating or cooling as desired/necessary to maintain or adjust temperature inside the cabinet/casing at a desired value. Selecting average room temperature should require minimum power in this configuration.

Figure 30A:
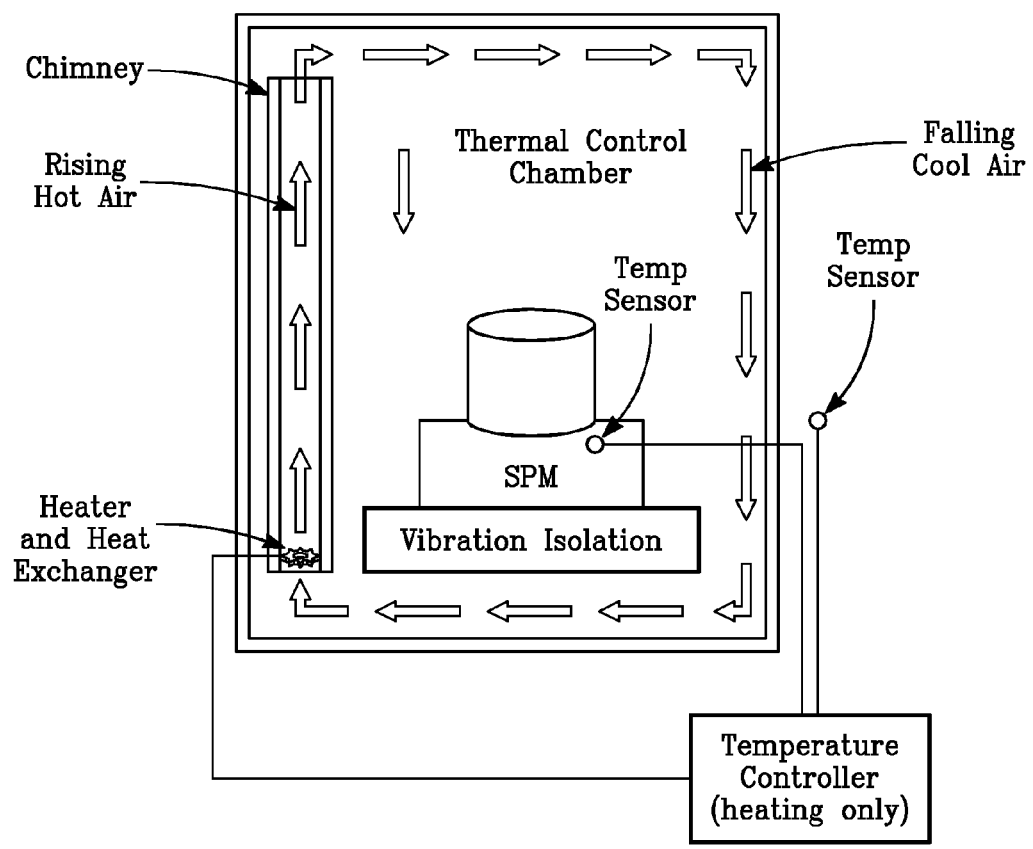
FIGS. 30A, 30B and 30C show an AFM cabinet with internal temperature control using convection heating and cooling.
Figure 30B:
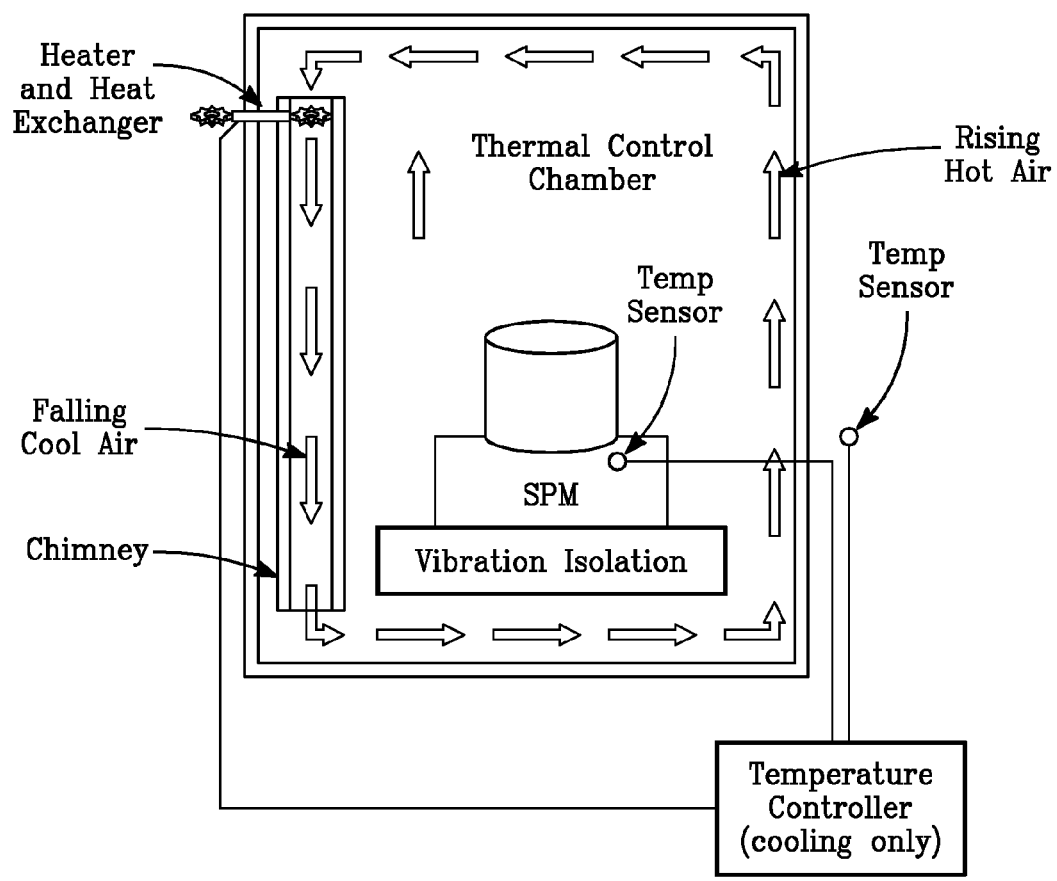
Figure 30C:
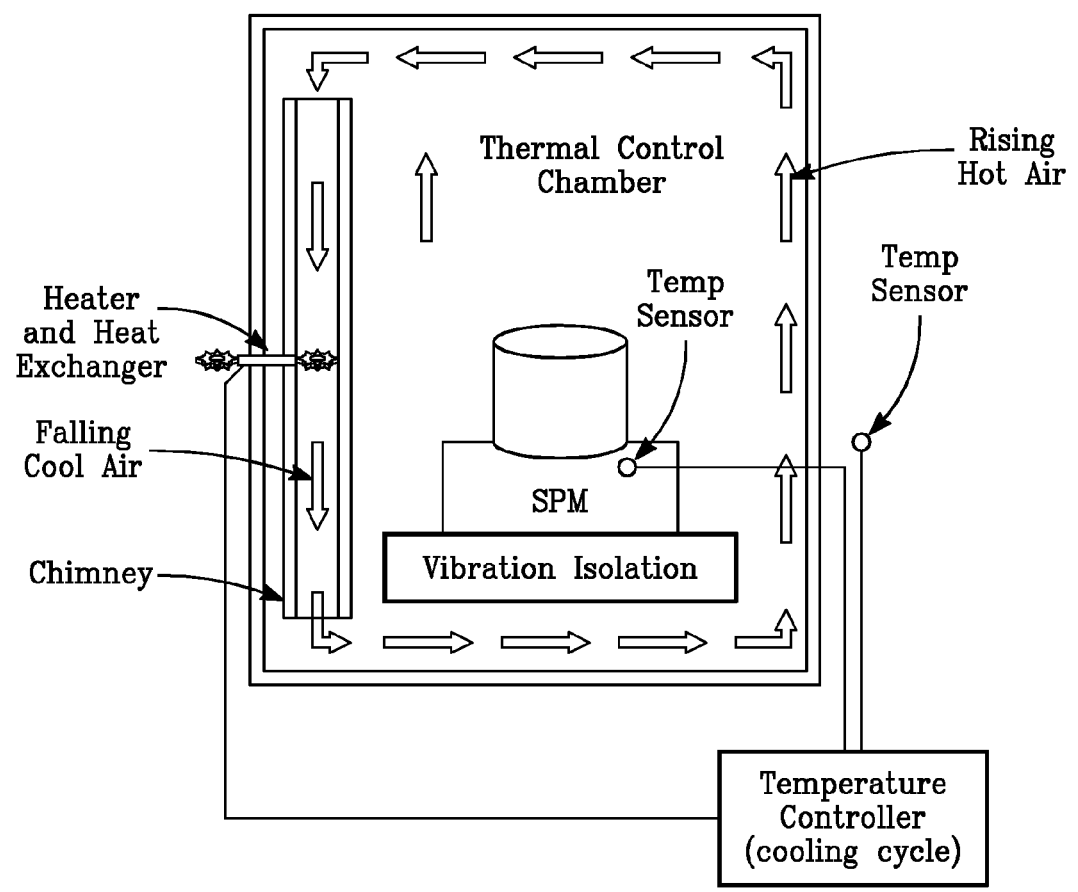

FIGS. 30A, 30B and 30C show an AFM cabinet with internal temperature control using convection heating, and a flowchart of cabinet operation. When heating an AFM inside the cabinet, the temperature may be kept up to 5 degrees above room temperature so that static heat from the AFM can flow out of the cabinet.

Preferably, the minimum operating temperature inside the cabinet is the difference between room temperature and AFM temperature inside the cabinet, with the AFM powered up. The temperature control servo may be a bang-bang controller (In control theory, a bang-bang controller (on-off controller), also known as a hysteresis controller, is a feedback controller that switches abruptly between two states) for the heating only/cooling only cabinets, or a full PID servo control. The cabinet may include one, or more than one heater/cooler and chimney. Vibration isolation may be inside or outside of the cabinet.

Figure 31:
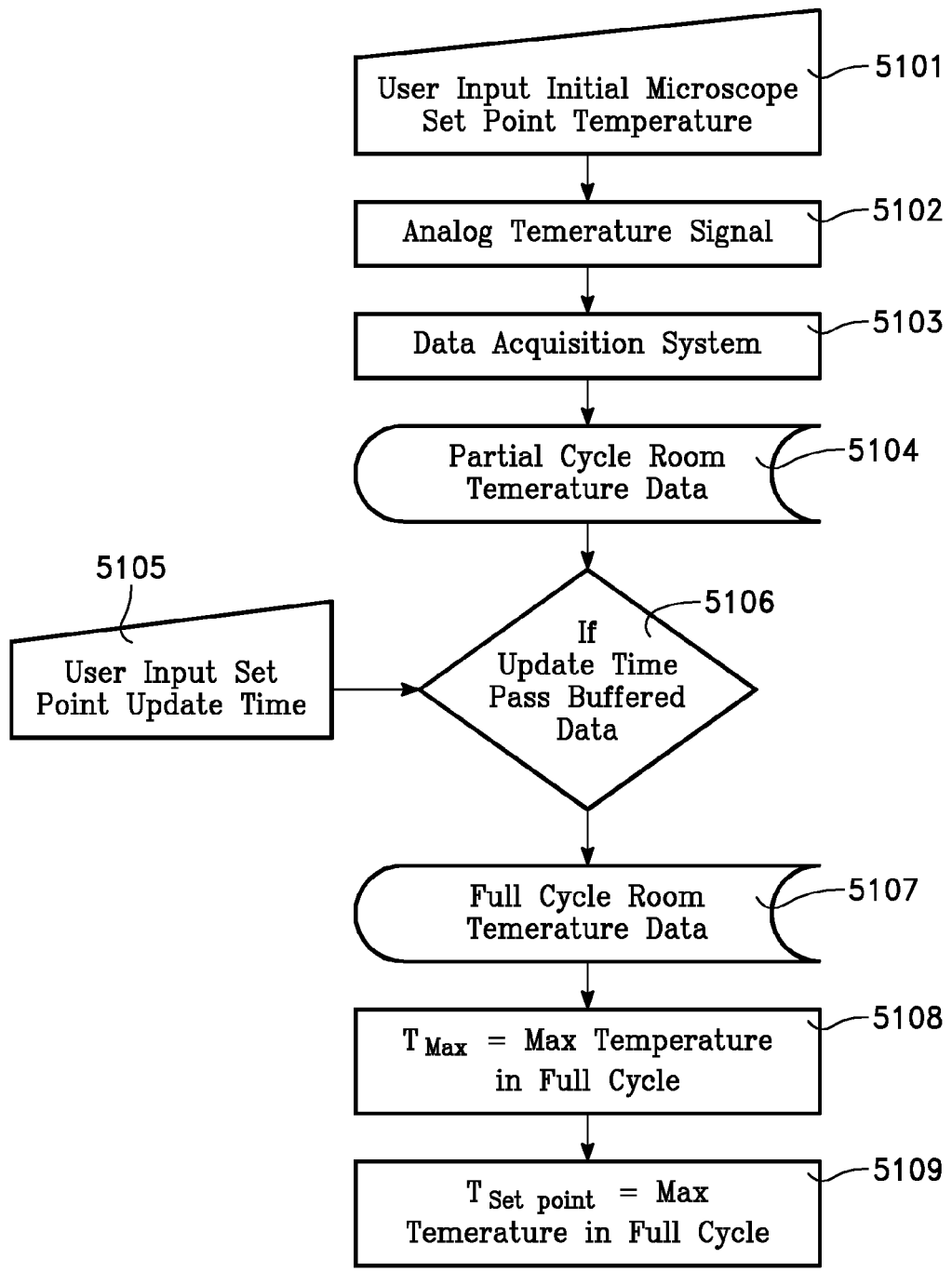
FIG. 31 is a flowchart showing automatic temperature setpoint adjustment.

The flowchart in FIG. 31 shows a method for recording room temperature, and selecting/maintaining a set-point temperature for an AFM inside a temperature-controlled cabinet by feedback control of power applied to a heater inside the cabinet. At block 5101, a user sets an initial AFM temperature inside a cabinet. At block 5102, the analog room temperature signal is detected from the room temperature sensor. At block 5103, this signal is converted to digital form, and stored in data buffer 5104. Room temperature values are collected at blocks 5103-5105 until a time for changing the set temperature arises at block 5106. At block 5107, recorded room temperature data is analyzed, and the maximum recorded temperature is identified at block 5108. The set-point temperature of the AFM may be updated to a value that is the sum of the maximum temperature and a user-defined offset (5109).

Figure 32:
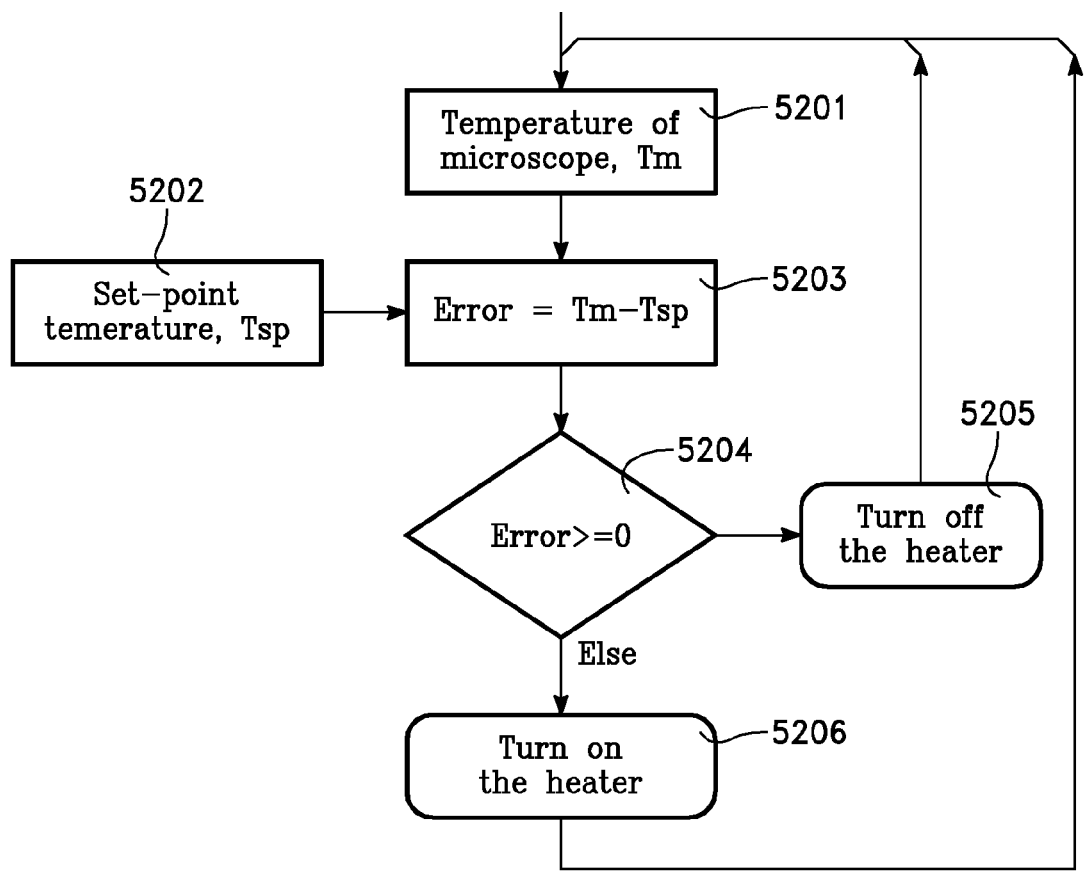
FIG. 32 is a flowchart that describes bang-bang (In control theory, a bang-bang controller, or on-off controller, also known as a hysteresis controller, is a feedback controller that switches abruptly between two states) feedback.

The flowchart in FIG. 32 describes bang-bang (In control theory, a bang-bang controller (on-off controller), also known as a hysteresis controller, is a feedback controller that switches abruptly between two states) feedback. At block 5201, AFM temperature is measured, then compared at block 5202 with set-point temperature. At block 5203, the error, denoted (Tm-Tsp), is determined. At block 5204, the error is compared with zero. Depending on the error's value, the heater is turned off at block 5205, or turned on at block 5206. Thereafter, cycle 5201-5204 repeats.

What is claimed is:

1. A method of on-line analysis of probe deflection signals collected in non-resonant oscillatory mode of AFM or another AFM mode at a sample location, which allows determining the deformation type of said sample, and applying to the collected signals a desired theoretical model for a defined deformation type to extract quantitative values of sample mechanical properties at said location, and repeating the collection steps at a plurality of different locations on said sample during lateral scanning to obtain quantitative maps of mechanical properties and surface topography in height images.

2. The method of claim 1 further comprising filtering of said signals including denoising, background removal and de-ringing.

3. The method of claim 2 further comprising wavelet filtering with adaptive approximation and details levels in said signals.

4. The method of claim 3 further comprising real-time point-to-point implementation of wavelet-based filtering with high throughput FPGA algorithms.

5. The method of claim 3 further comprising background removal from said signals with adaptive selection of wavelet denoising levels and trend levels.

6. The method of claim 1 further comprising adaptively optimizing set-point deflection of the AFM's probe to perform imaging with minimal sample-dependent and environment-dependent repulsive force for determining sample surface topography.

7. The method of claim 6 further comprising filtering and adaptively optimizing set-point deflection of said probe to perform imaging with minimal sample-dependent and environment-dependent repulsive force for determining sample surface topography.

8. A method of measuring electric and electromechanical characteristics of a sample in non-resonant oscillatory mode of operation of a probe-based instrument, by applying electric modulation/a periodically varying voltage to a probe-sample location at a frequency higher than the sample or probe oscillatory motion and detecting the probe electric or mechanical response through variations of its oscillatory parameters at or near the modulation frequency and at its harmonics in the probe/sample touching and non-touching parts of an oscillatory cycle.

9. The method of claim 8 further comprising measuring sample piezo-response, which stimulates the sample expansion/contraction, detected by the probe amplitude and phase changes at the modulation frequency in the touching part of the cycle, and detecting electrostatic force and force gradient variations in the non-touching part of the cycle by monitoring changes in probe oscillatory characteristics at or near modulation frequency and its harmonics, using electric force microscopy or Kelvin force microscopy measurements.

10. The method of claim 8, wherein measurements of magnetic force and gradients between a probe with ferromagnetic coating and a sample in the non-touching parts of the cycle enable magnetic force microscopy measurements in non-resonant oscillatory mode.

* * * * *